(12) United States Patent
Gaffoglio et al.

(10) Patent No.: US 9,688,252 B2
(45) Date of Patent: Jun. 27, 2017

(54) BATTERY SWAPPING SYSTEM AND TECHNIQUES

(71) Applicant: Tesla Motors, Inc., Palo Alto, CA (US)

(72) Inventors: Eric Orlando Gaffoglio, Anaheim Hills, CA (US); Alan Clarke, Signal Hill, CA (US); Matthew Lee Brown, Redondo Beach, CA (US)

(73) Assignee: TESLA, INC., Palo Alto, CA (US)

( * ) Notice: Subject to any disclaimer, the term of this patent is extended or adjusted under 35 U.S.C. 154(b) by 43 days.

(21) Appl. No.: 14/694,995

(22) Filed: Apr. 23, 2015

(65) Prior Publication Data
US 2015/0307068 A1 Oct. 29, 2015

Related U.S. Application Data

(60) Provisional application No. 61/983,328, filed on Apr. 23, 2014.

(51) Int. Cl.
*B60S 5/06* (2006.01)
*B60L 11/18* (2006.01)

(52) U.S. Cl.
CPC ............. *B60S 5/06* (2013.01); *B60L 11/1822* (2013.01); *Y02T 90/124* (2013.01)

(58) Field of Classification Search
CPC ....... B60L 11/1822; B60S 5/06; Y02T 90/124
See application file for complete search history.

(56) References Cited

U.S. PATENT DOCUMENTS

| 5,612,606 A | * | 3/1997 | Guimarin ................. B60K 1/04 104/34 |
| 8,006,793 B2 | | 8/2011 | Heichal et al. |
| 8,013,571 B2 | | 9/2011 | Agassi et al. |
| 8,164,300 B2 | | 4/2012 | Agassi et al. |

(Continued)

FOREIGN PATENT DOCUMENTS

JP 62292580 A * 12/1987

*Primary Examiner* — Michael McCullough
*Assistant Examiner* — Mark Hageman
(74) *Attorney, Agent, or Firm* — Garlick & Marison; Bruce E. Garlick

(57) ABSTRACT

A method of exchanging an electrical energy storage system (EESS) in an electric vehicle includes: positioning an electric vehicle in x and y directions on an EESS exchange station; after positioning, raising the electric vehicle to a predetermined height using a first lift; after raising the electric vehicle, raising an EESS lift toward the electric vehicle until the EESS lift is correctly positioned relative to a first EESS; after raising the EESS lift, removing fasteners that secure a first EESS to the electric vehicle; placing an EESS conveyor underneath the EESS lift; after placing the EESS conveyor, lowering the first EESS onto the EESS conveyor using the EESS lift; after lowering the first EESS, removing the first EESS and instead placing a second EESS underneath the electric vehicle; after placing the second EESS underneath the electric vehicle, raising the second EESS toward the electric vehicle using the EESS lift until the second EESS is correctly positioned relative to the electric vehicle; after raising the second EESS, fastening the second EESS onto the electric vehicle; and after fastening the second EESS, lowering the electric vehicle using the vehicle lift.

12 Claims, 47 Drawing Sheets

(56) References Cited

U.S. PATENT DOCUMENTS

| | | | | |
|---|---|---|---|---|
| 8,973,254 B2 * | 3/2015 | Droste | ................ | B60L 11/1877 |
| | | | | 29/730 |
| 9,026,357 B2 | 5/2015 | Park et al. | | |
| 9,428,154 B2 * | 8/2016 | Mulato | ............... | B60L 11/1822 |
| 2011/0251935 A1 * | 10/2011 | German | .................... | B60S 5/06 |
| | | | | 705/30 |
| 2013/0104361 A1 * | 5/2013 | Corfitsen | ............ | B60L 11/1822 |
| | | | | 29/402.08 |
| 2013/0197803 A1 | 8/2013 | Park et al. | | |
| 2014/0369798 A1 * | 12/2014 | Escande | .................... | B60S 5/06 |
| | | | | 414/584 |
| 2016/0107619 A1 * | 4/2016 | Clarke | ..................... | B60S 5/06 |
| | | | | 29/402.08 |

\* cited by examiner

BATTERY SWAPPING SYSTEM AND TECHNIQUES

CROSS-REFERENCE TO RELATED APPLICATION

This application claims the benefit of the filing date of U.S. provisional application 61/983,328, entitled BATTERY SWAPPING SYSTEM AND TECHNIQUES and filed Apr. 23, 2014, the entire contents of which are incorporated herein by reference.

BACKGROUND

Vehicles using sustainable energy sources, such as electricity, are becoming more prevalent as an alternative to combustion-engine vehicles. An electric or hybrid vehicle that has at least one electric traction motor typically has a battery pack or other enclosure that contains one or more electrochemical cells that provide propulsion energy for the motor or motors. Because the process of charging such cells usually takes some amount of time, some vehicles are designed so that the battery can be replaced with another battery, to replenish power in the vehicle or to address malfunction in the current battery.

BRIEF DESCRIPTION OF DRAWINGS

FIG. 10 shows the tube guide on the door as the vehicle is pulling in.

DETAILED DESCRIPTION

This document describes systems and techniques for swapping an electrical energy storage system, such as a battery pack of an electric vehicle. In some implementations, a system can be used to exchange the battery pack of a Model S or Model X vehicle from Tesla Motors, Inc., for another (e.g., fully charged) battery pack. For example, this can provide a more rapid way of replenishing the electric energy for the electric vehicle and can enable electric vehicles to travel essentially nonstop on long road trips.

In some implementations, the battery swap system is configured for use by one or more technicians, who will monitor certain aspects of the system's operation and make necessary inputs when appropriate. For example, the battery-swapping system can be installed at a remote location (e.g., along a highway between two cities) and one or more technicians can be stationed at the location for operating the system. This can reduce or eliminate the need for the system to have vision components, which may otherwise be needed to align the battery pack or other components. Using techniques described herein it may be possible to exchange the battery pack of a vehicle in less than fifteen minutes.

Figure 1:
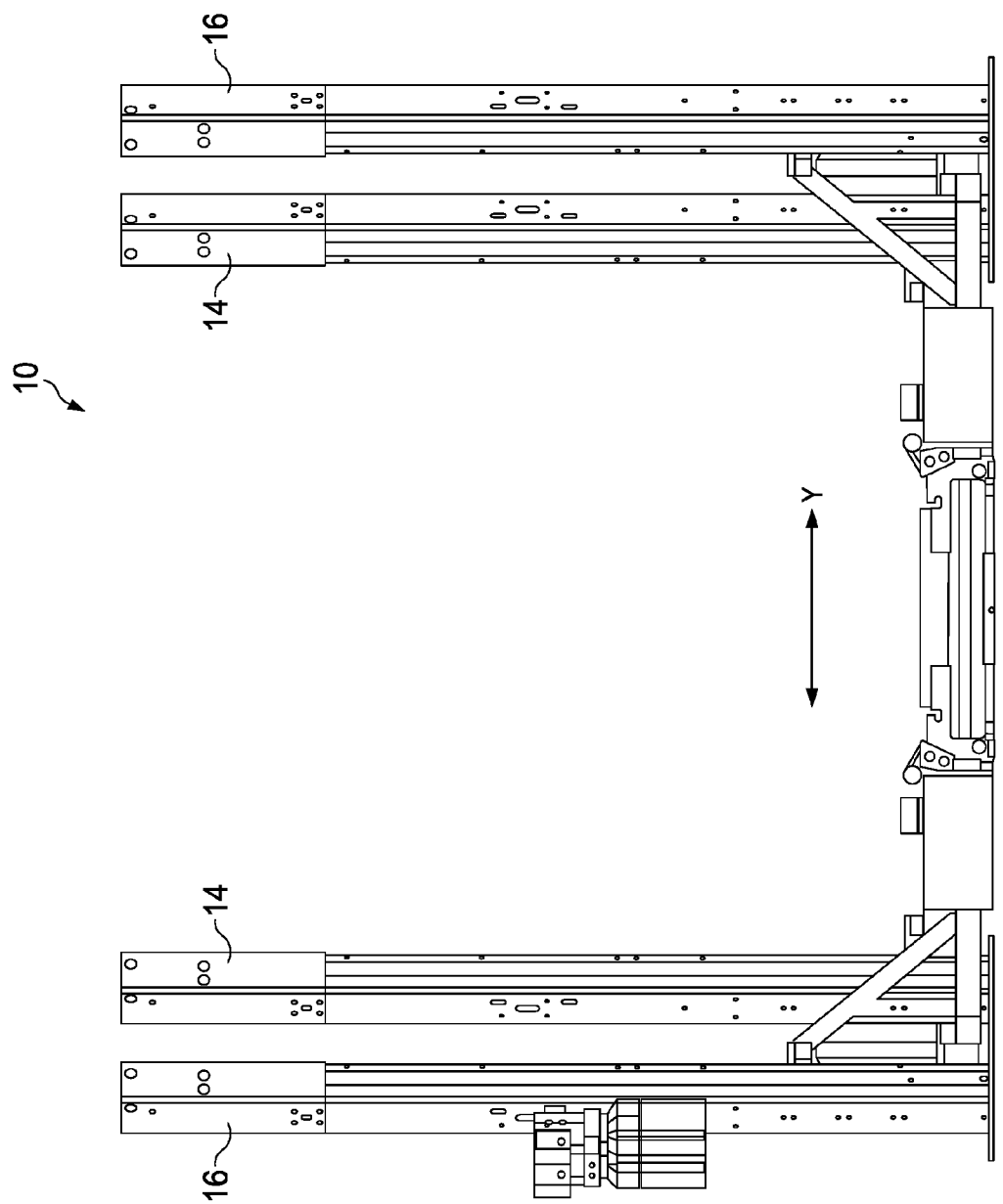
FIGS. 1-3 shows a layout of an example concept in respective front, side and top views.
Figure 2:
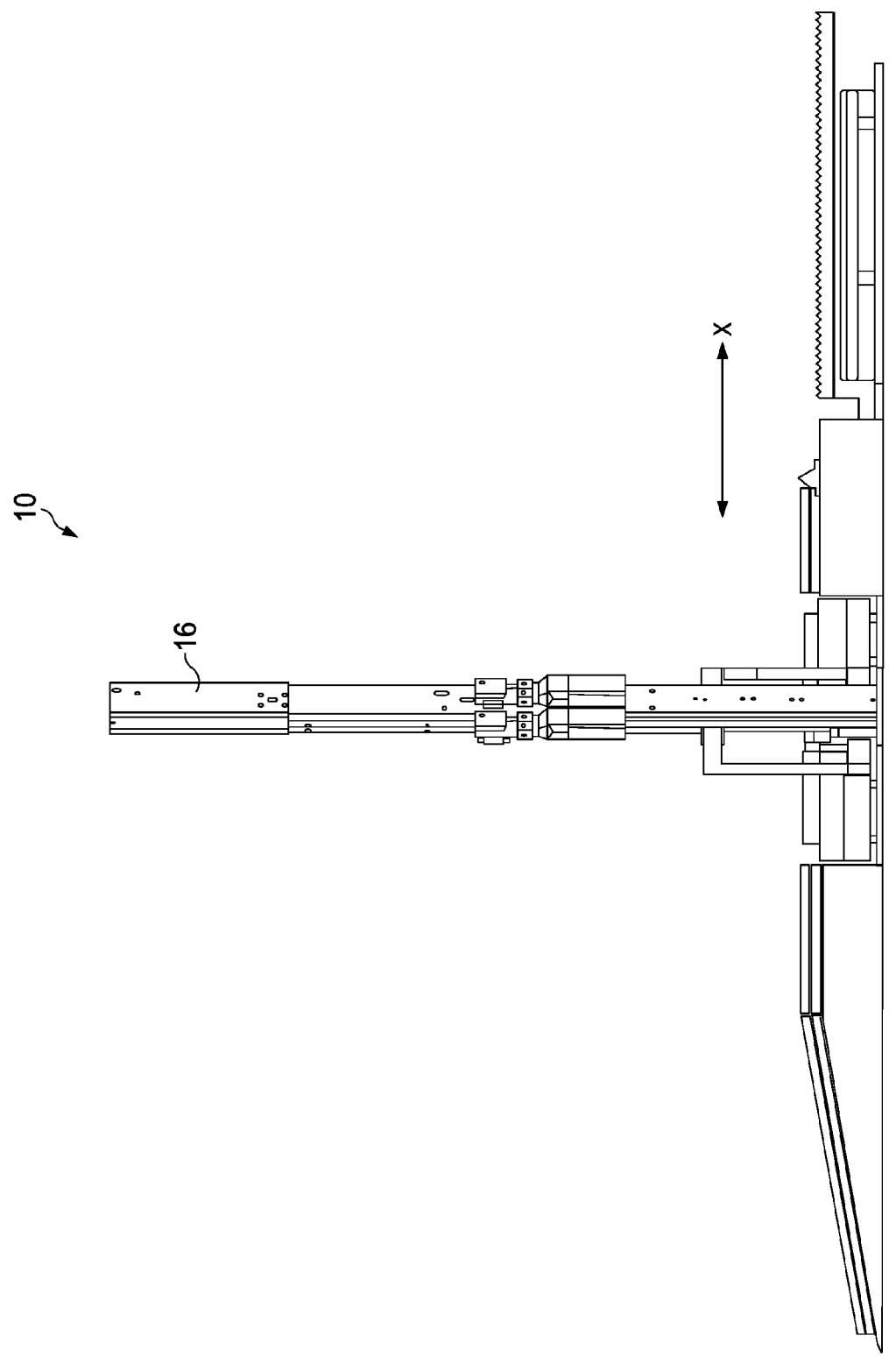
Figure 3:
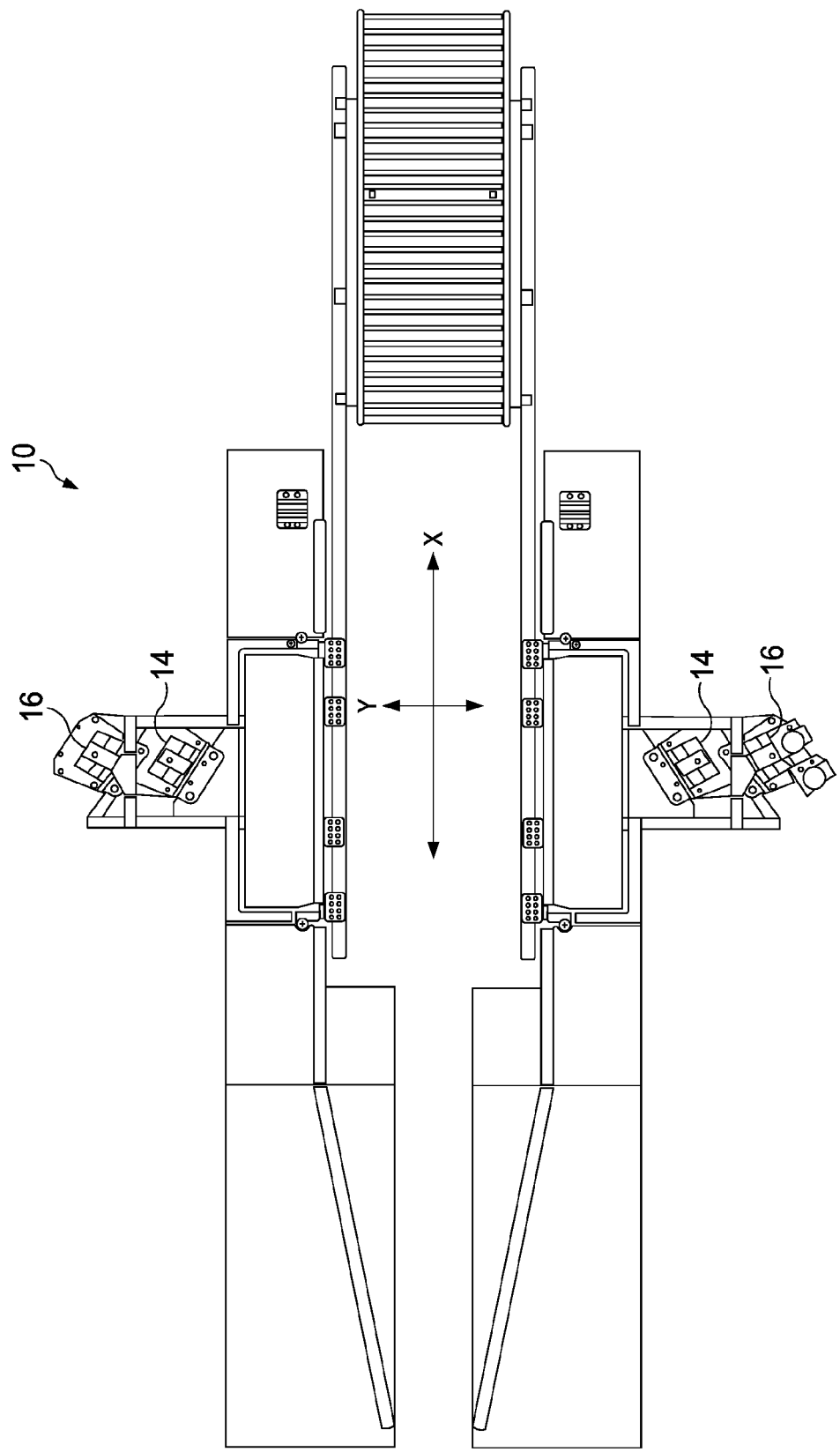

FIGS. 1-3 show a layout of an example concept of an electrical energy storage system (EESS) exchange station 10 in respective front, side and top views. The system includes inboard lifts 14 and outboard lifts 16. As shown in FIG. 3, inboard lifts 14 are arranged so as to be positioned on either side of a vehicle, in a Y direction, once the vehicle is on EESS exchange station 10, which is Y direction is perpendicular to an X direction in a horizontal plane. Similarly, outboard lifts 16, collectively referred to an EESS lift or battery lift, are also arranged so as to be positioned on either side of a vehicle (once on EESS exchange station 10), and outside of inboard lifts 14, in a Y direction relative to the vehicle. Here, the inboard lifts 14 are designed to raise the vehicle above ground, and the outboard lifts 16 are designed to remove the battery pack from underneath the vehicle in the elevated position, and replace the battery pack with a new one. The listed measurements and other dimensions are for illustrative purposes only.

Figure 4:
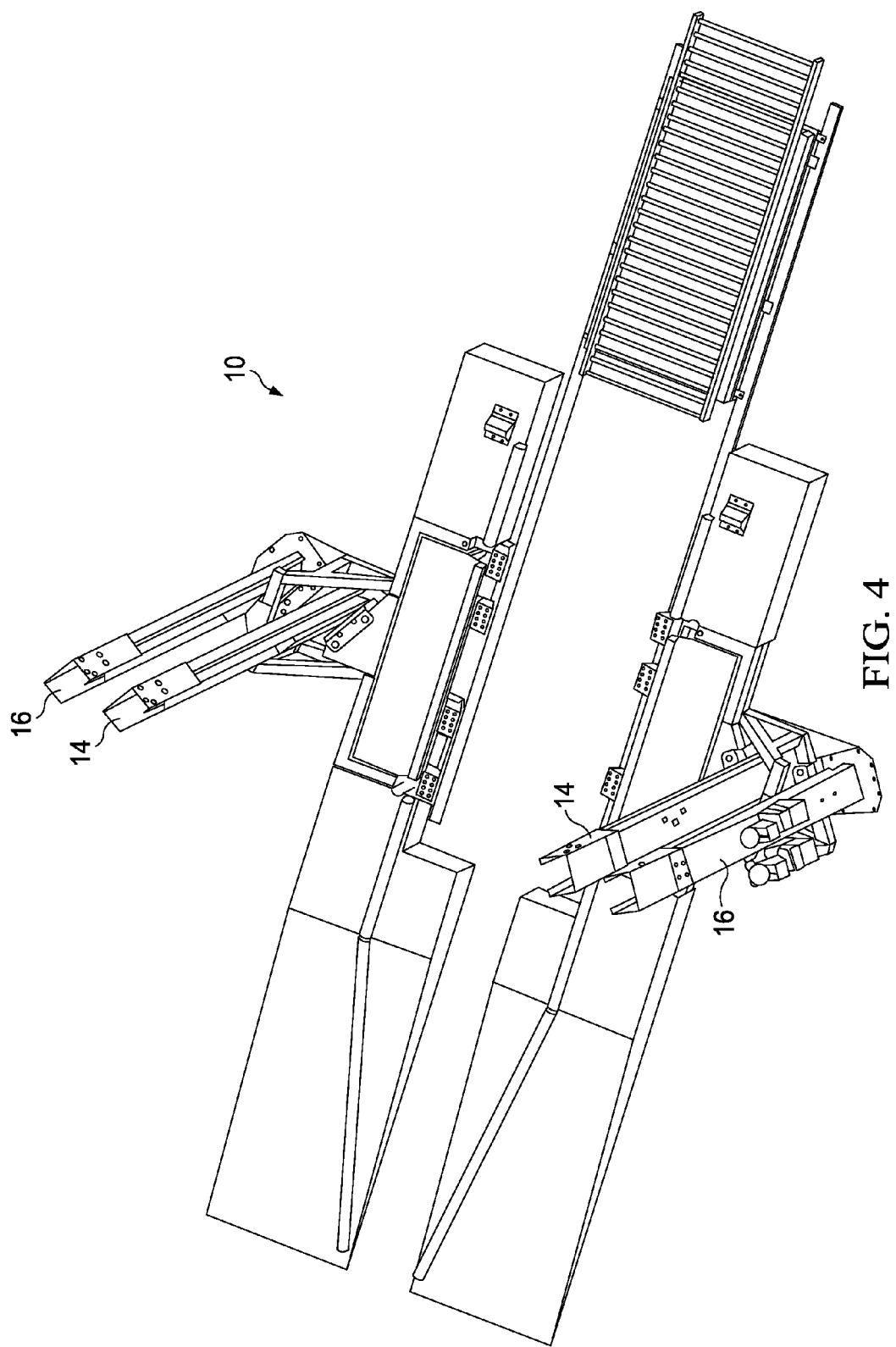
FIG. 4 shows the system before a vehicle enters the station.
Figure 5:
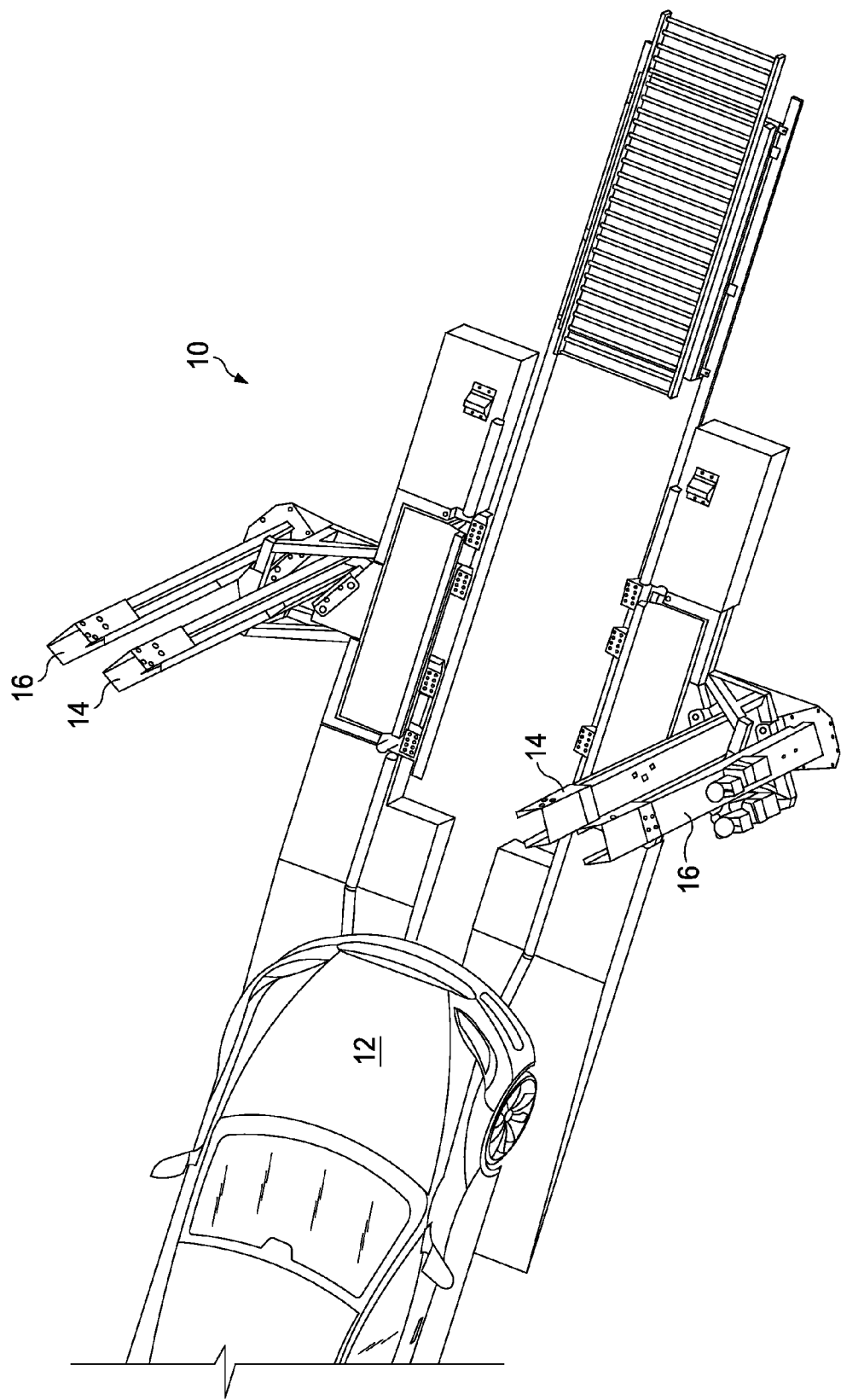
FIG. 5 shows that the vehicle is guided by rollers as it enters the station.
Figure 6:
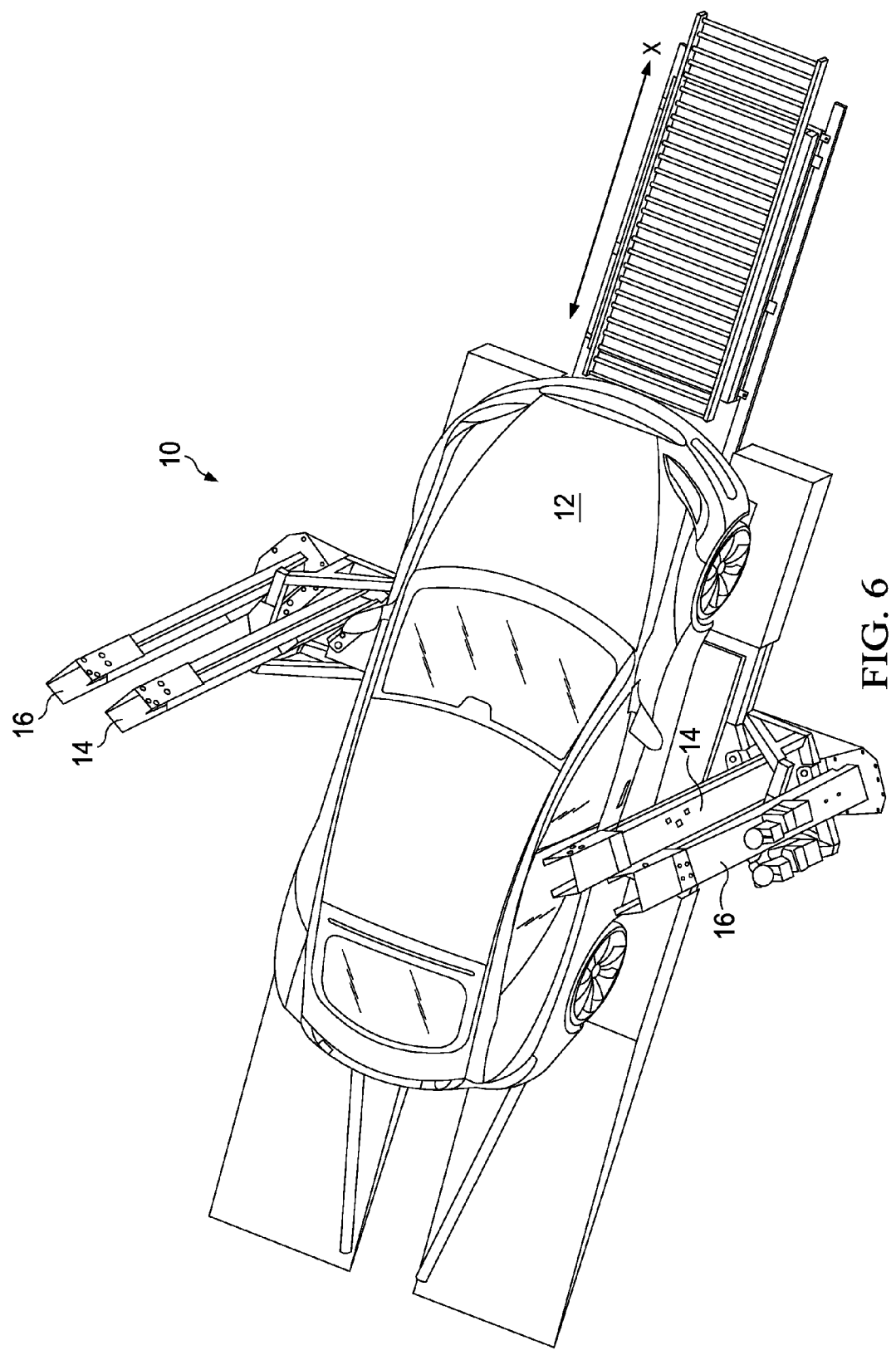
FIG. 6 shows that the vehicle creeps forward until it is correctly positioned in the X direction.
Figure 7:
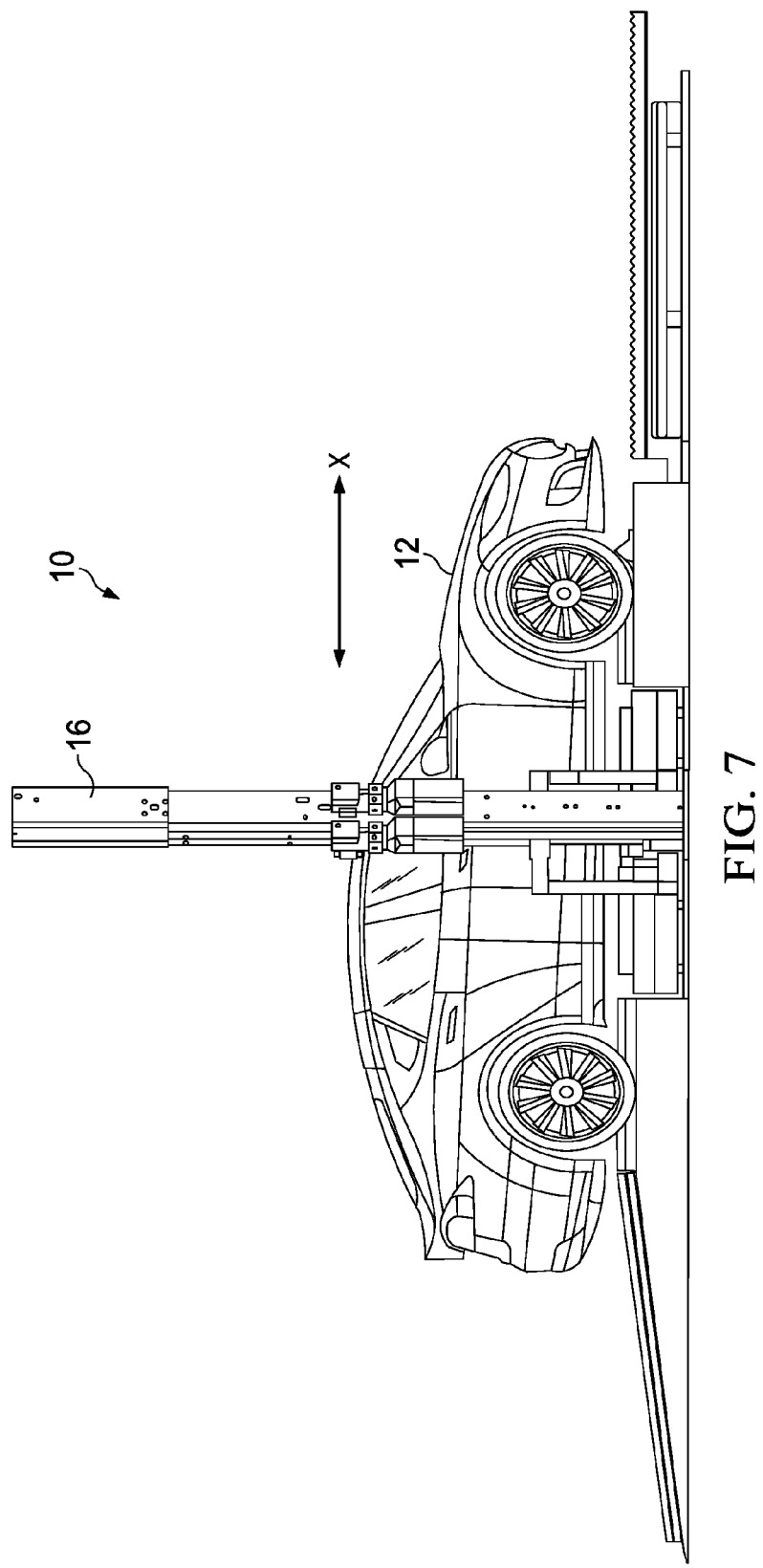
FIG. 7 shows that the vehicle is correctly positioned in the X direction, that the jack mode is enabled, and that vehicle power is turned off.
Figure 8:
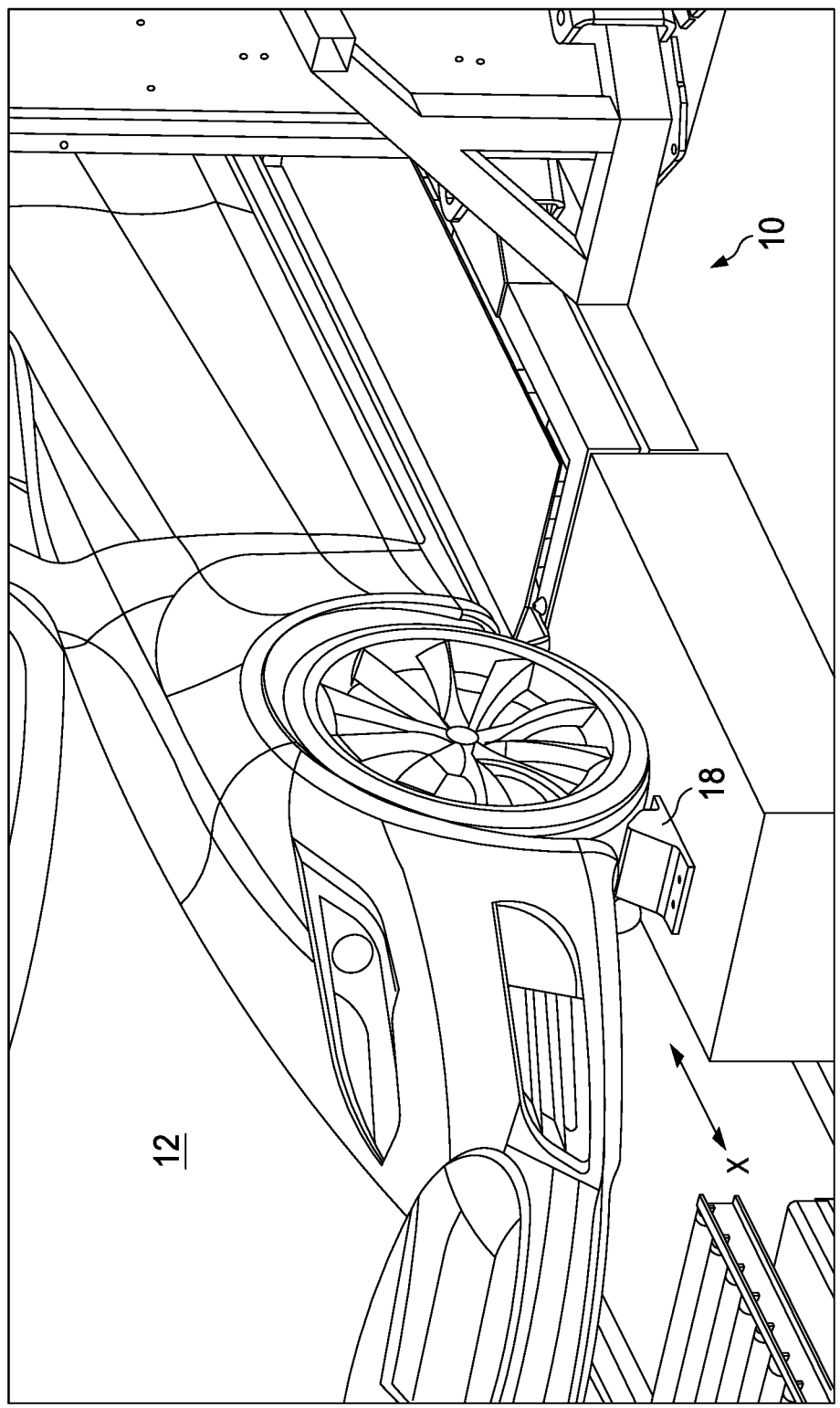
FIG. 8 shows that vehicle chocks can be used to control the position in X direction.
Figure 9:
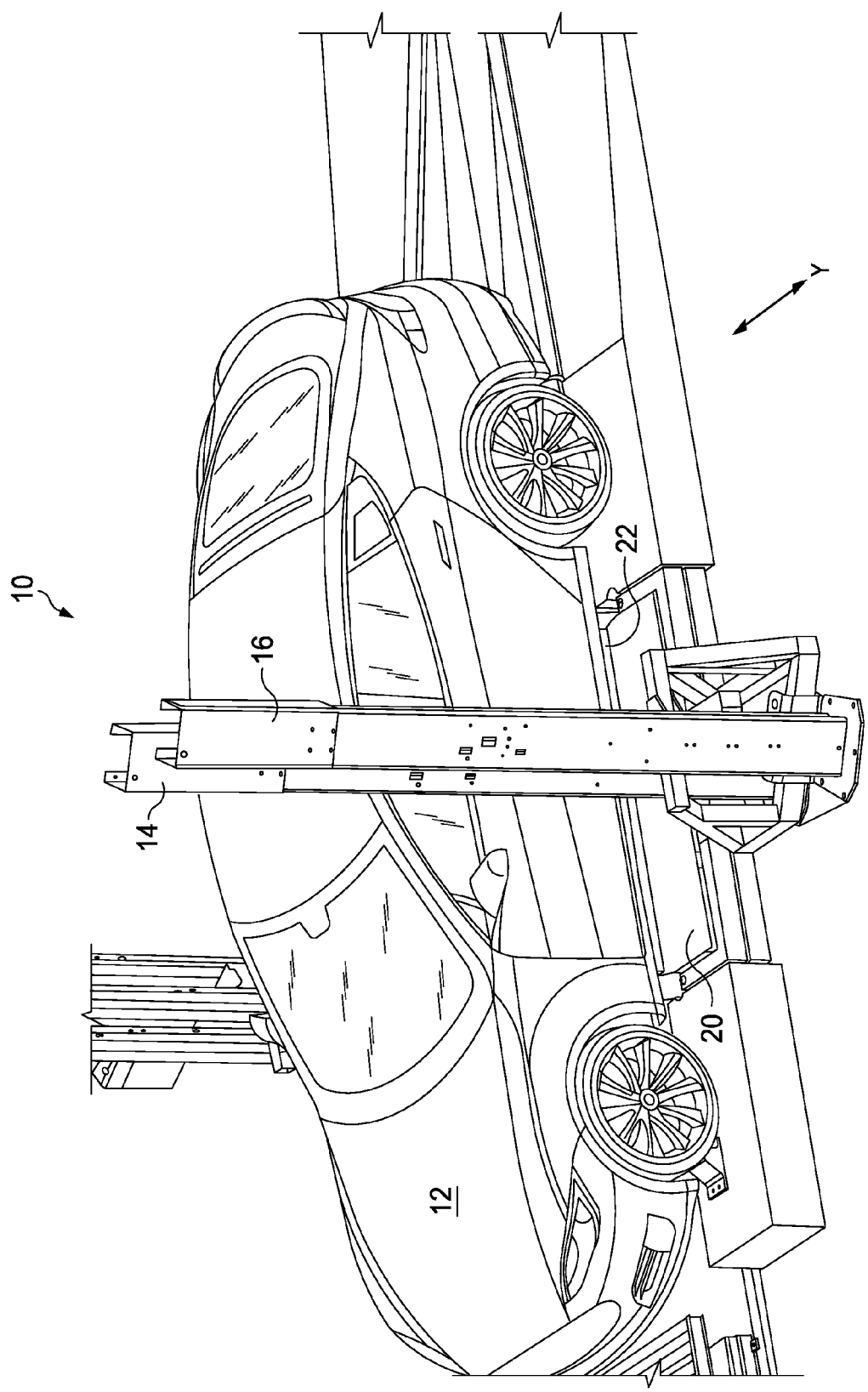
FIG. 9 shows that the vehicle rolls over horizontal doors while pulling in, and that steel tube guides on the doors can help align the vehicle in the Y direction.
Figure 10:
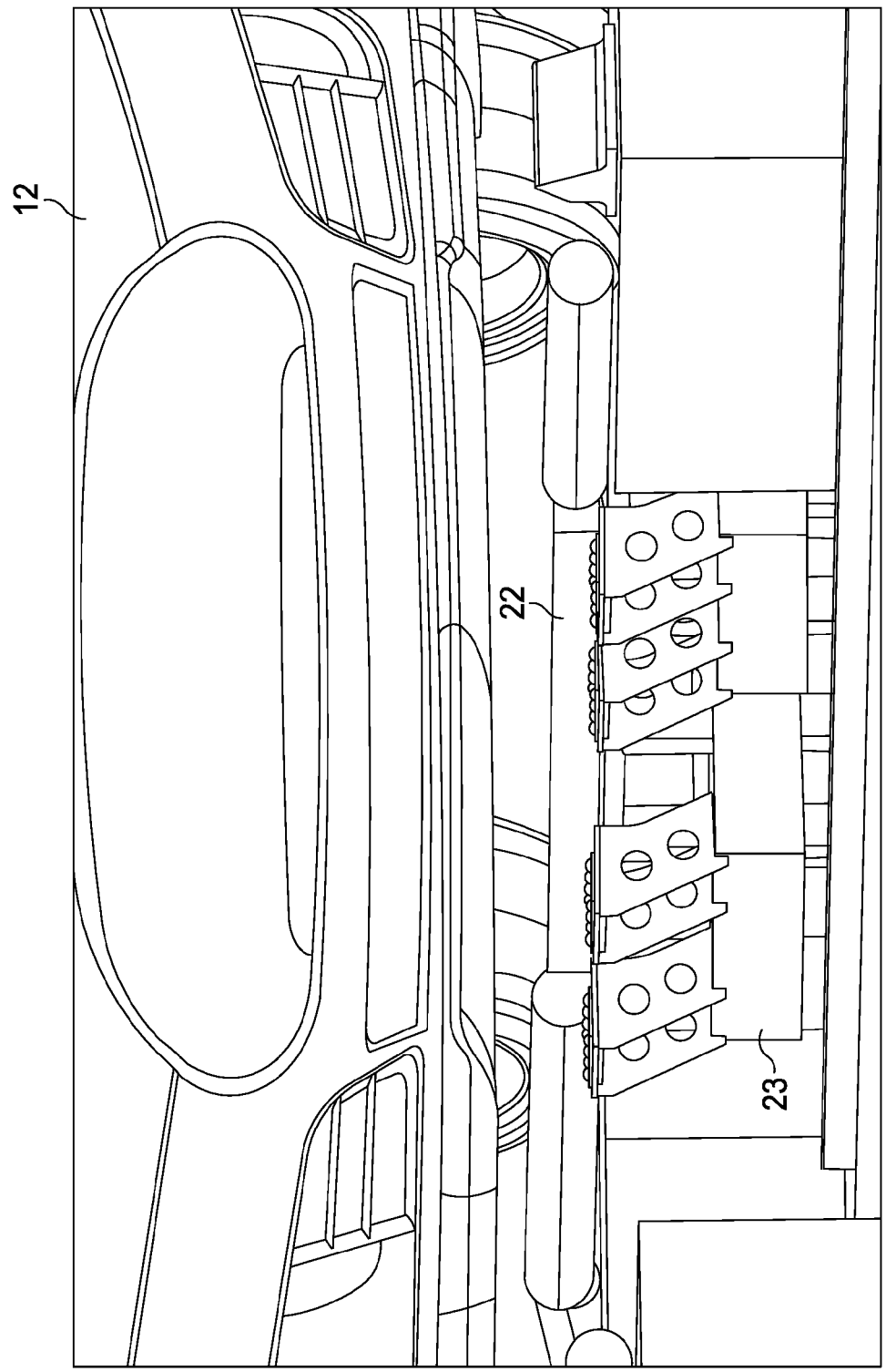
Figure 11:
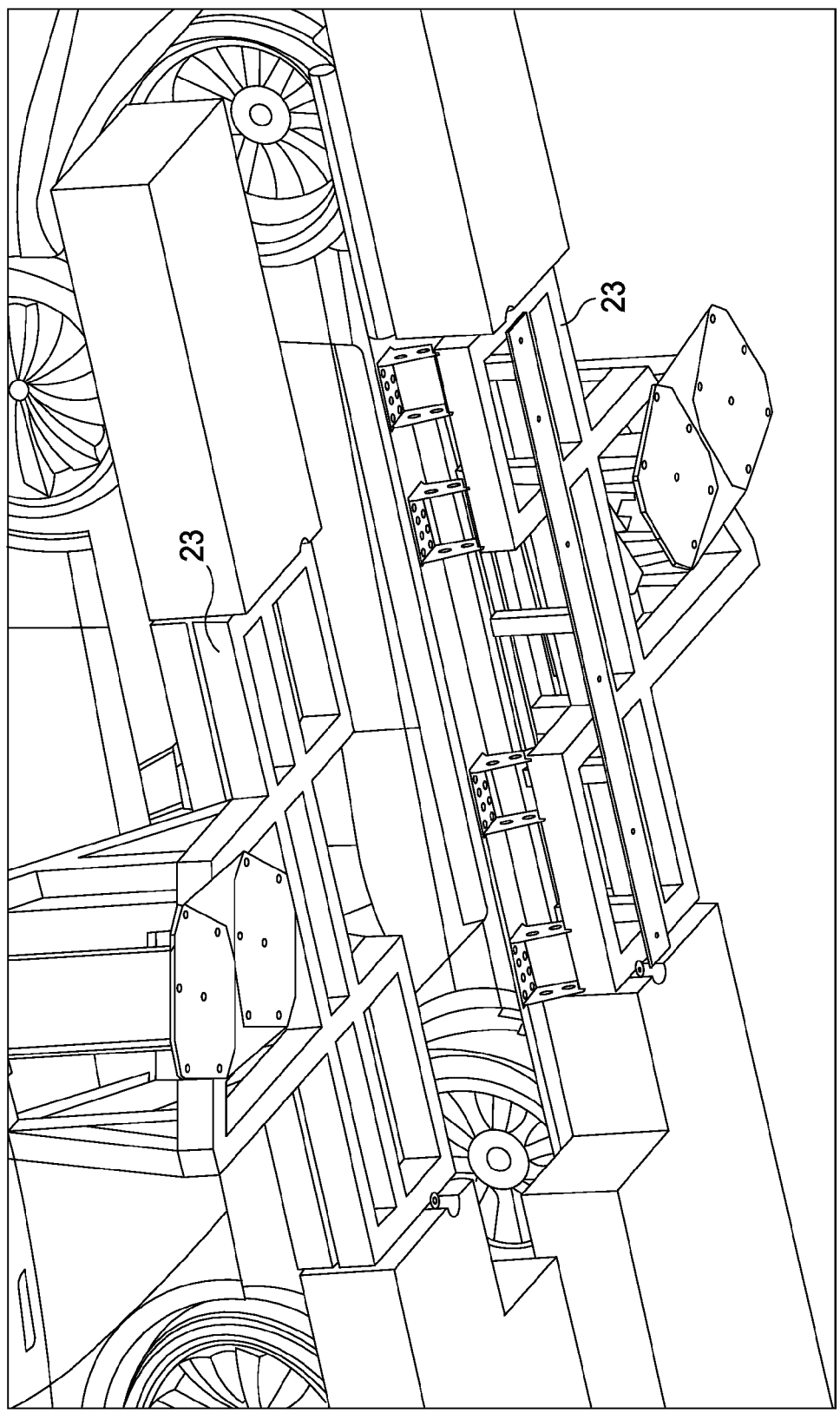
FIG. 11 is a view from below and shows door supports, and a tube under the door.

FIGS. 4-44 show examples relating to battery swap processes. FIG. 4 shows the EESS exchange station 10 system before a vehicle enters the station. FIG. 5 shows that the vehicle 12 is guided by rollers as it enters the station 10. FIG. 6 shows that the vehicle creeps forward until it is correctly positioned in the X direction. FIG. 7 shows that the vehicle is correctly positioned in the X direction, that the jack mode is enabled, and that vehicle power is turned off. FIG. 8 shows that vehicle chocks 18 can be used to control the position in X direction. FIG. 9 shows that the vehicle rolls over horizontal doors 20 while pulling in, and that steel tube guides 22 on the doors can help align the vehicle in the Y direction (see also tube guides 22 in FIGS. 17 and 18). The doors also cover the battery support structures. FIG. 10 shows the tube guide 22 on the door as the vehicle is pulling in, as well as one battery support structure 23. FIG. 11 is a view from below and shows door supports, a tube under the door and battery support structures 23.

Figure 12:
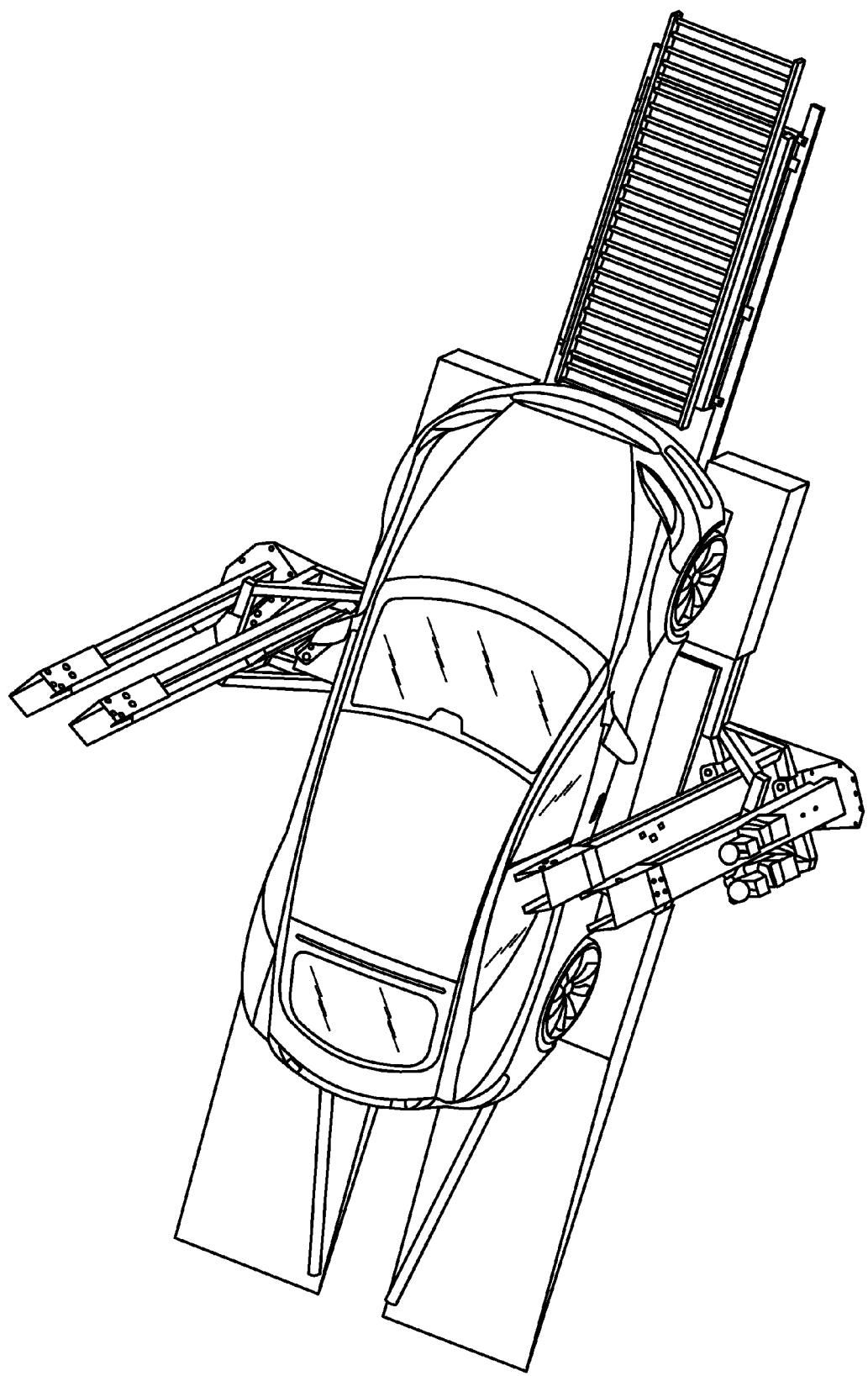
FIG. 12 shows that the process of raising the vehicle is beginning.
Figure 13:
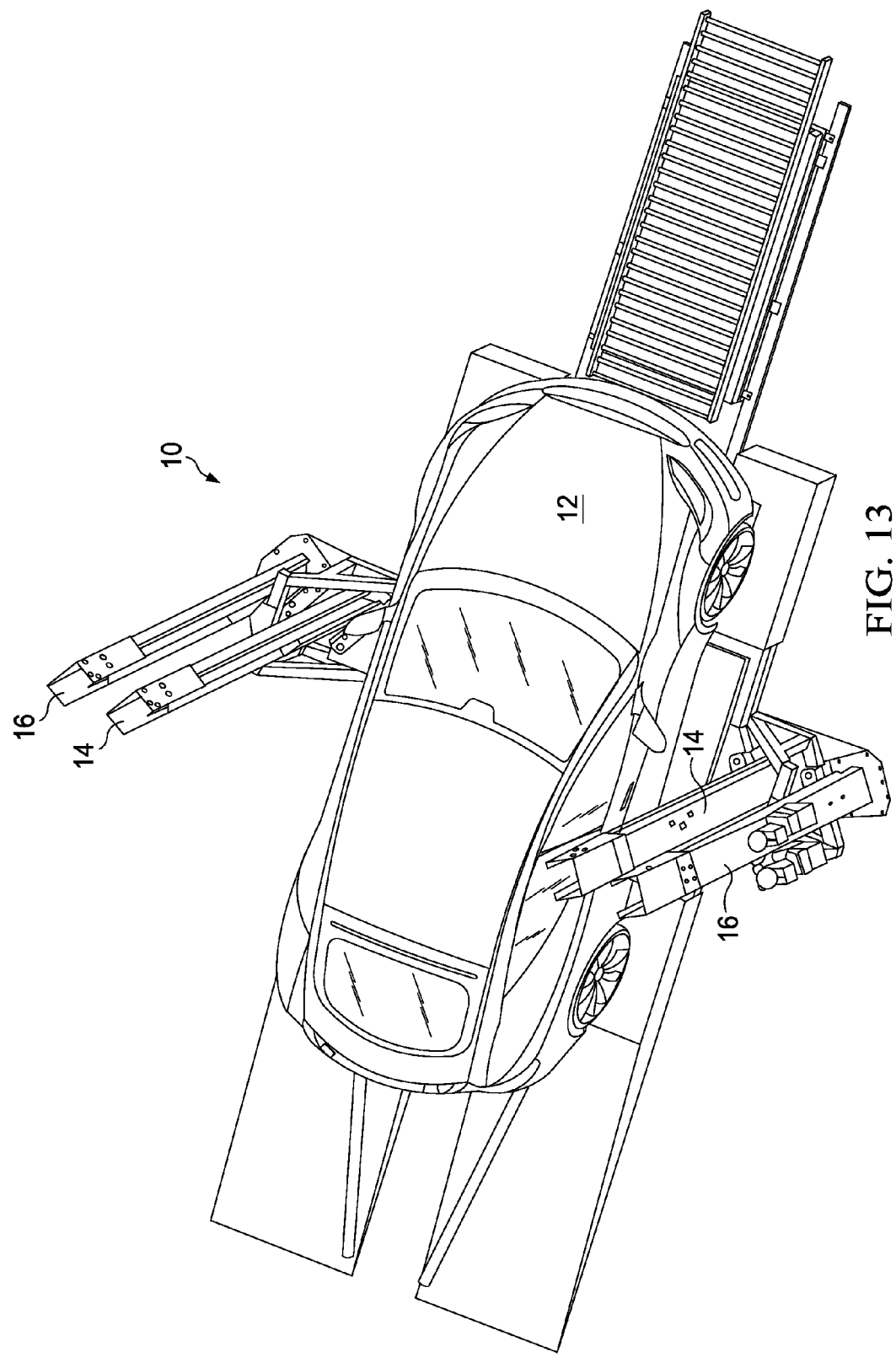
FIG. 13 shows that the inboard lifts are starting the process of raising the vehicle to a predetermined height (in this example, about 65 inches).
Figure 14:
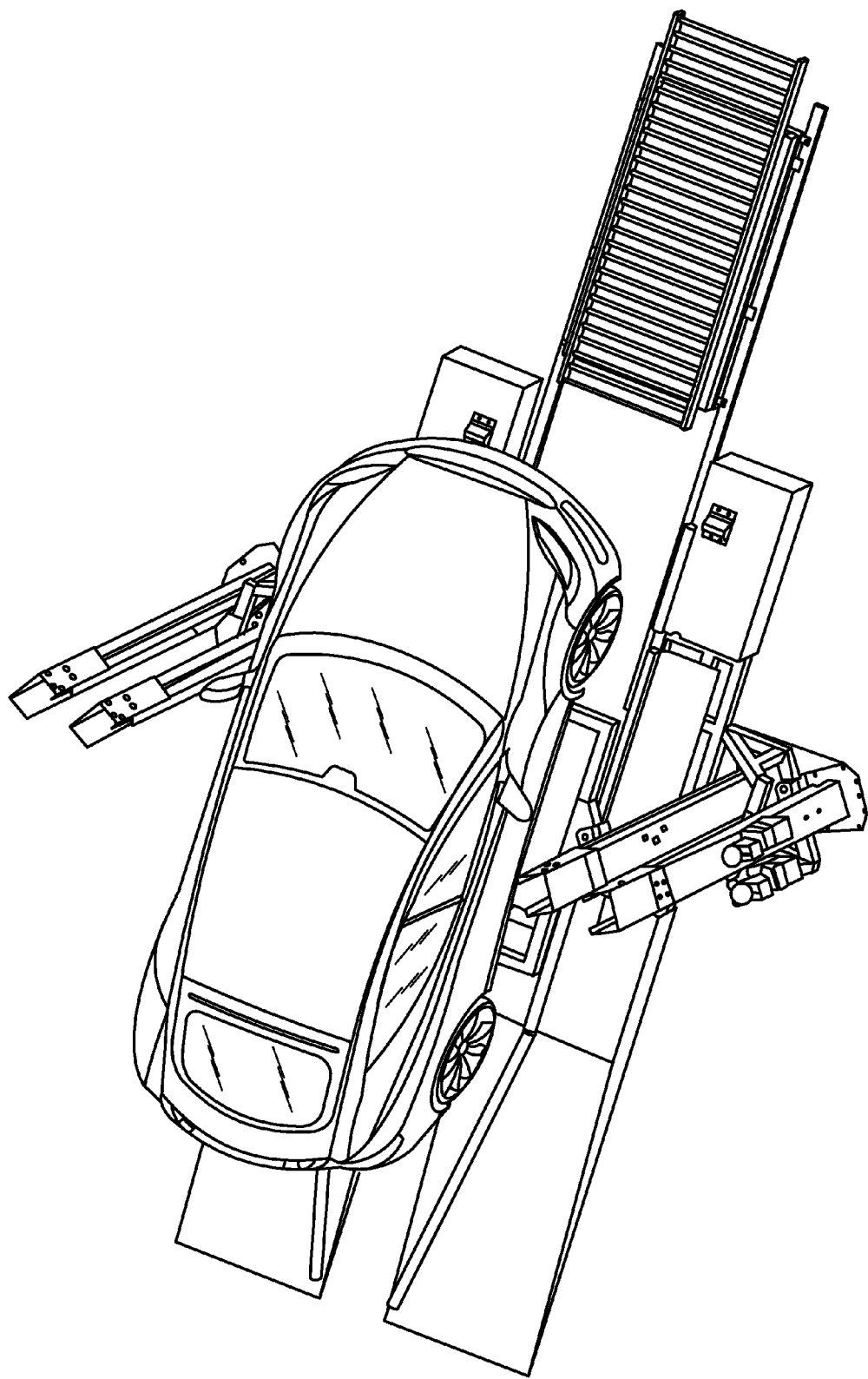
FIGS. 14-15 show that the vehicle has been lifted to the predetermined height.
Figure 15:
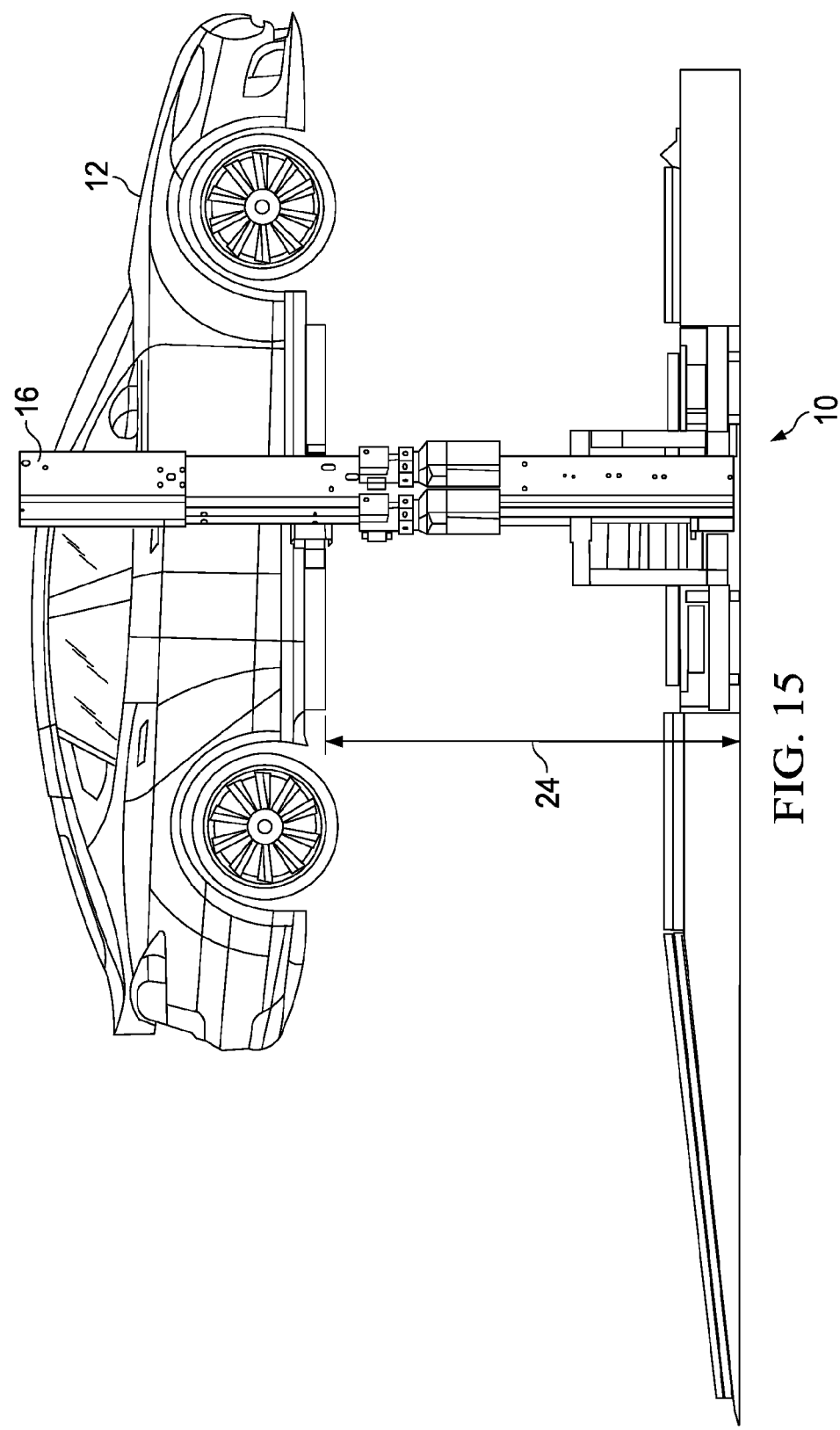
Figure 16:
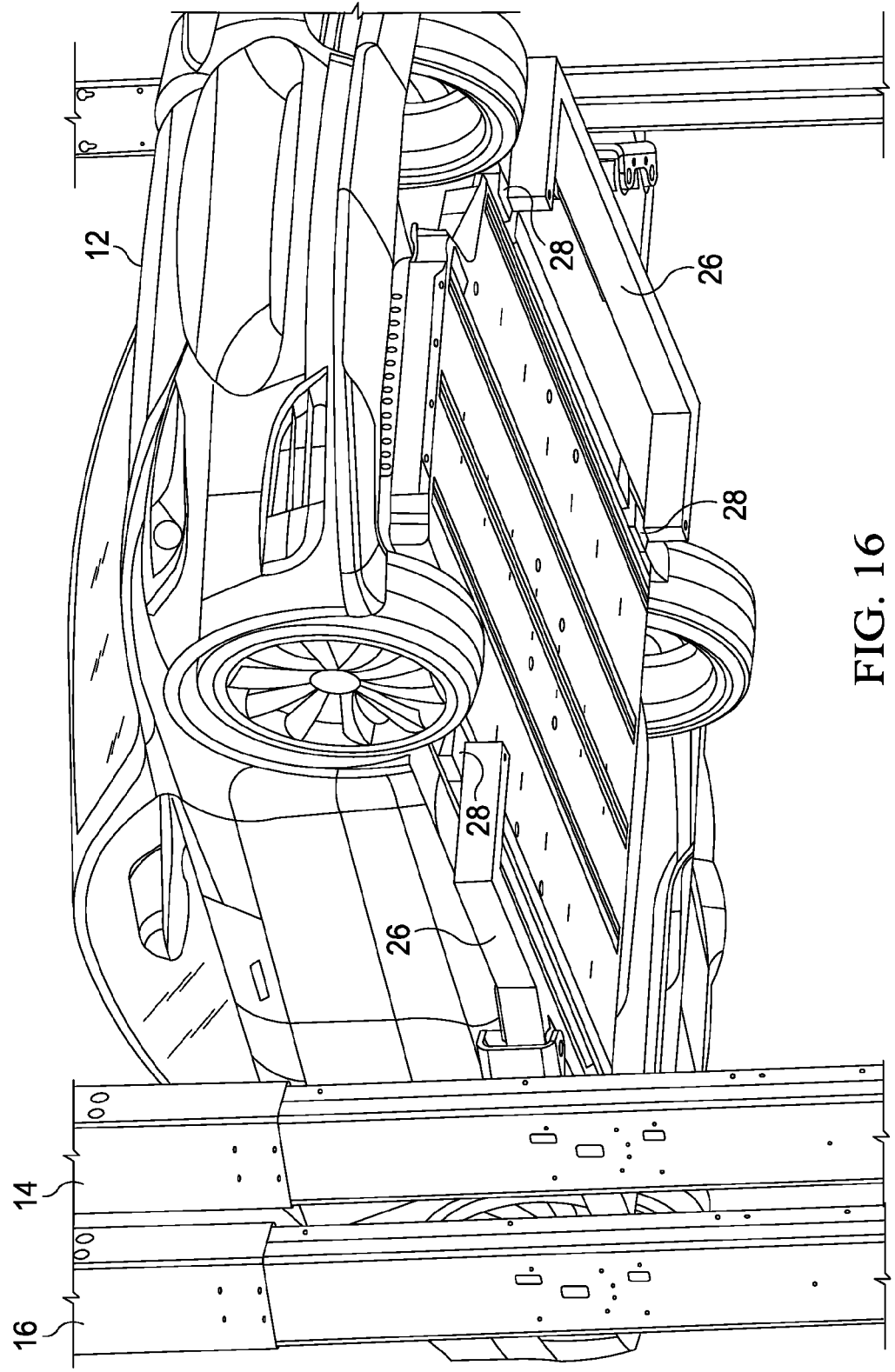
FIG. 16 shows that lifting arms one the inboard lifts can engaged jack pads (or any other suitable lifting points) on the vehicle.

FIG. 12 shows that the process of raising the vehicle is beginning. The driver of the vehicle (e.g., the vehicle owner or a valet) can exit the vehicle before the raising begins. FIG. 13 shows that the inboard lifts 14 are starting the process of raising the vehicle to a predetermined height (in this example, about 65 inches). FIGS. 14-15 show that the vehicle has been lifted to the predetermined height, as shown by reference number 24 in FIG. 15. FIG. 16 shows that lifting arms 26 of the inboard lifts 14 can engage jack pads 28 (or any other suitable lifting points) on the vehicle 12. In some implementations, the car is suspended at four points, however, only three are shown in FIG. 16 due to lifts 14 and 16 obscuring one of the points. For example, cone locators can be used for positioning.

Figure 17:
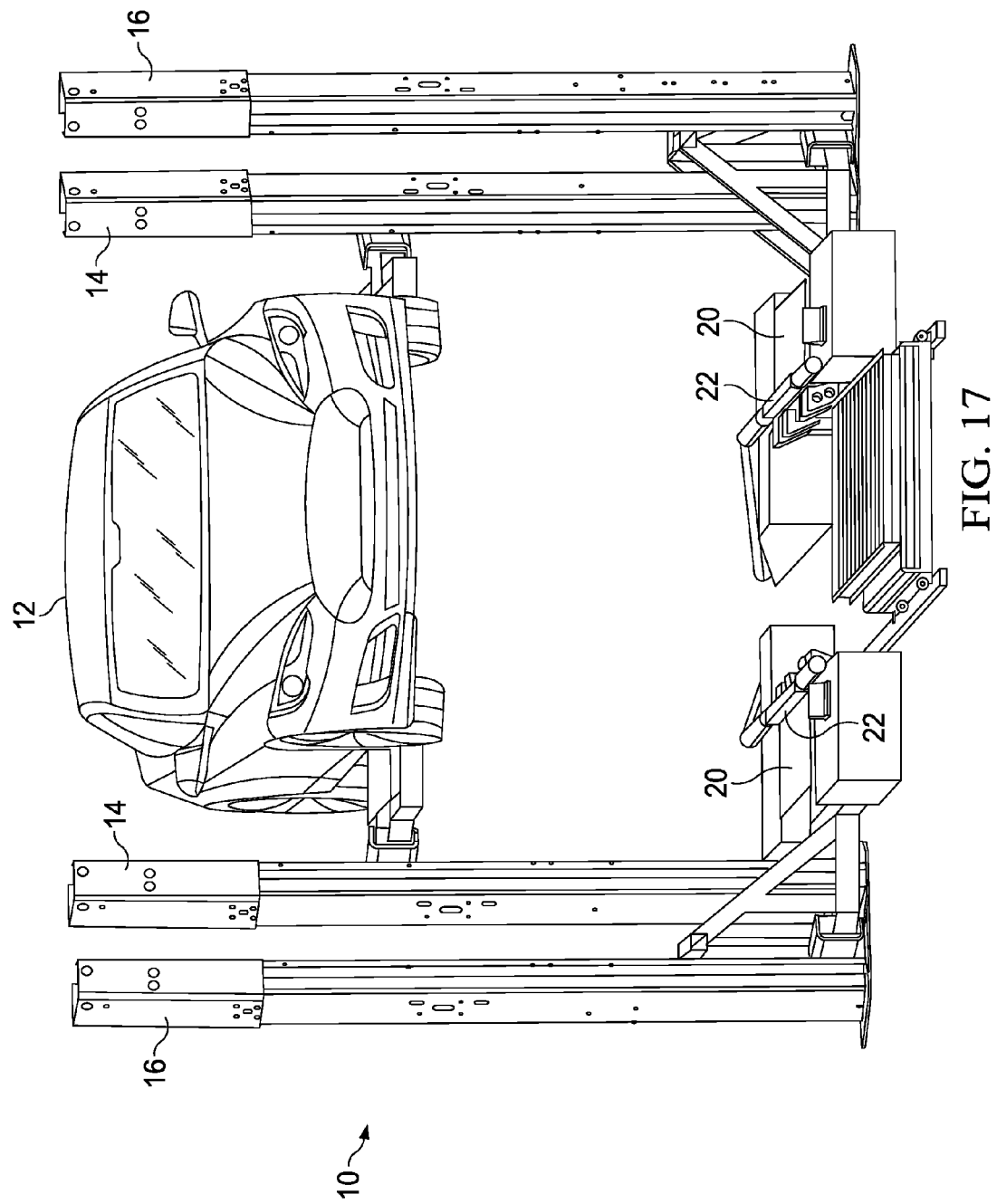
FIG. 17 shows that the system is ready to open the floor doors.
Figure 18:
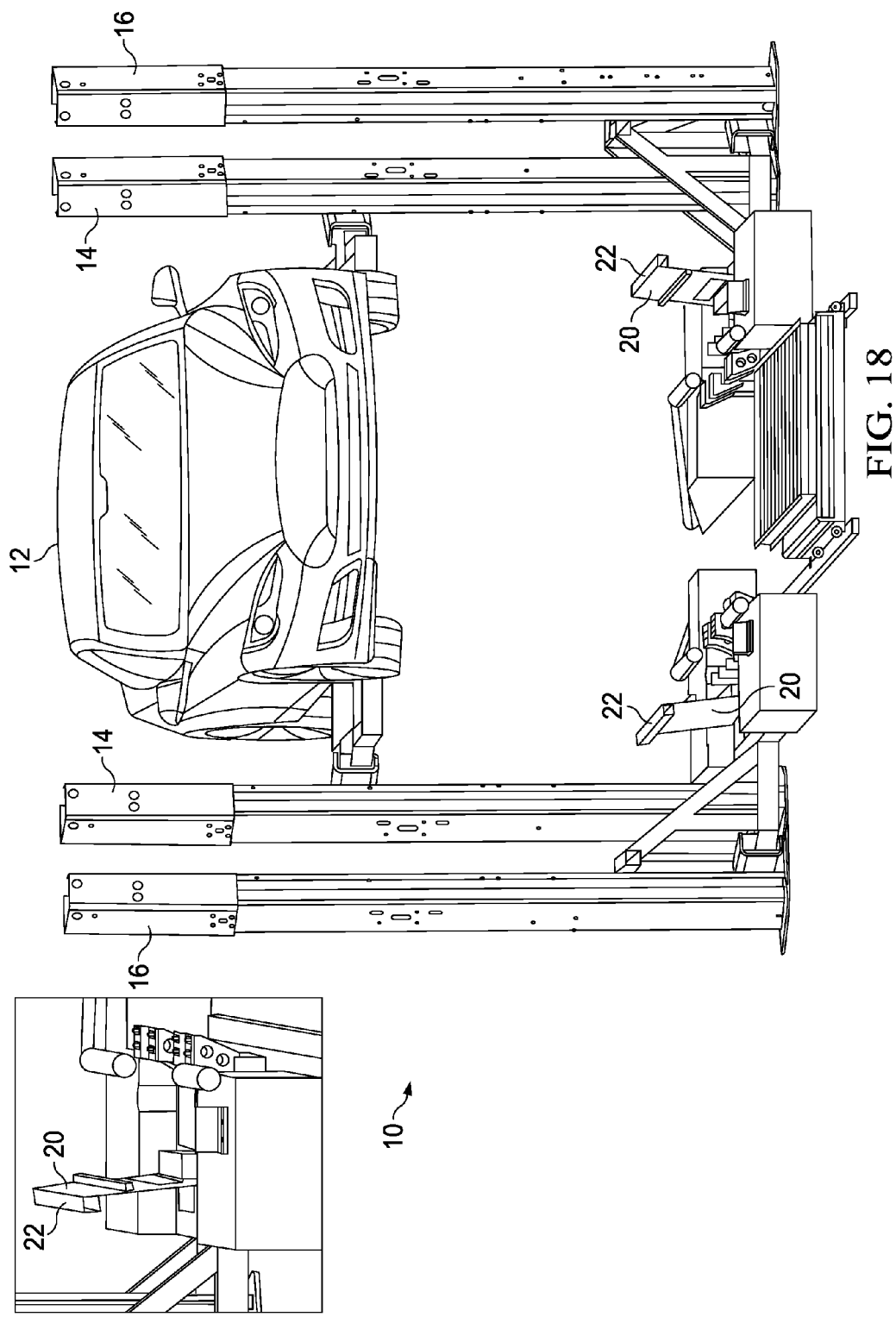
FIG. 18 shows that the doors have been opened.

FIG. 17 shows that the system is ready to open the floor doors 20. FIG. 18 shows that the doors 20 have been opened. For example, the inset shows that the door can pivot over-center to stay open.

Figure 19:
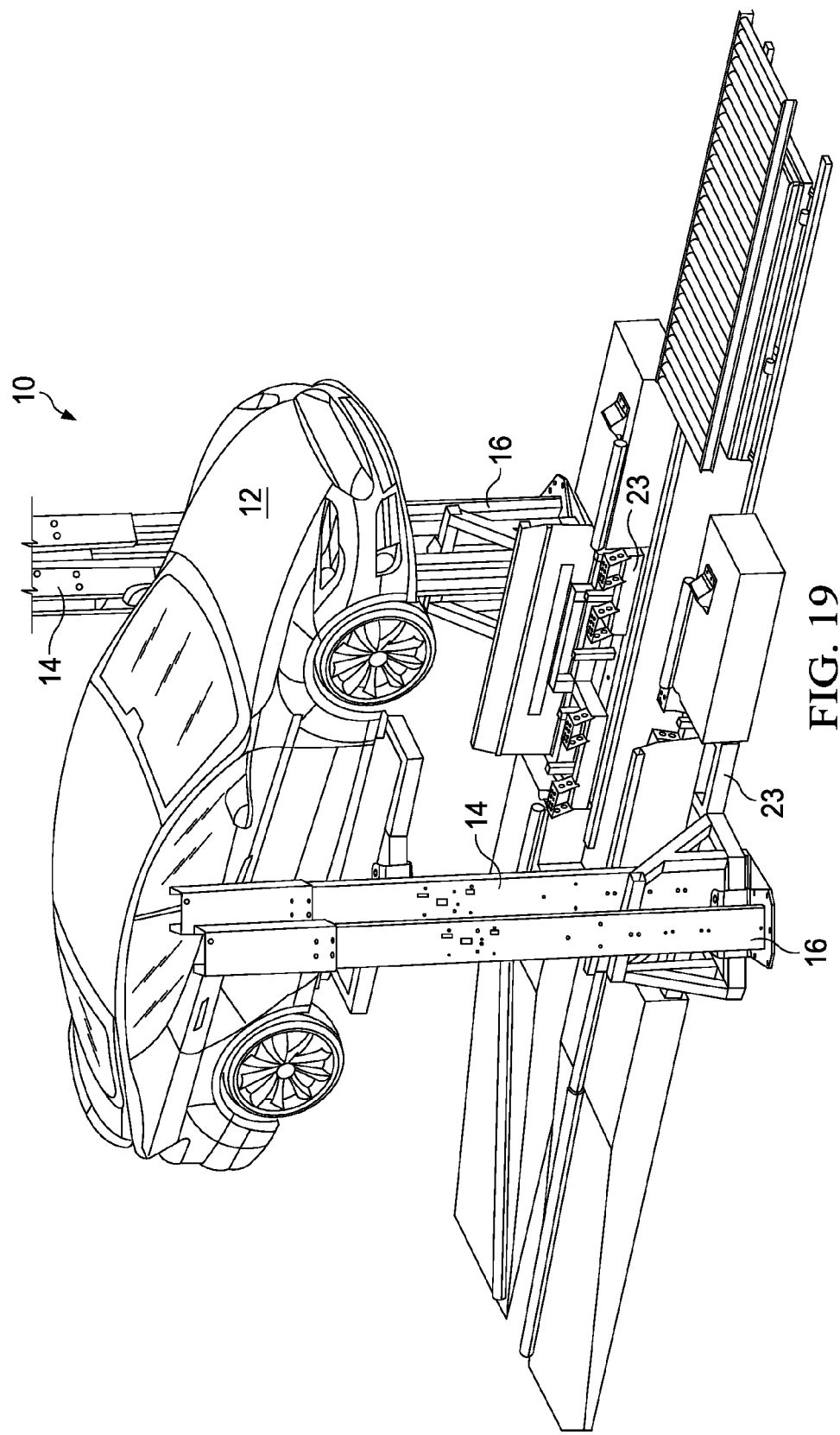
FIG. 19 shows that the system is ready to raise the battery lift (here, the outboard lift).
Figure 20:
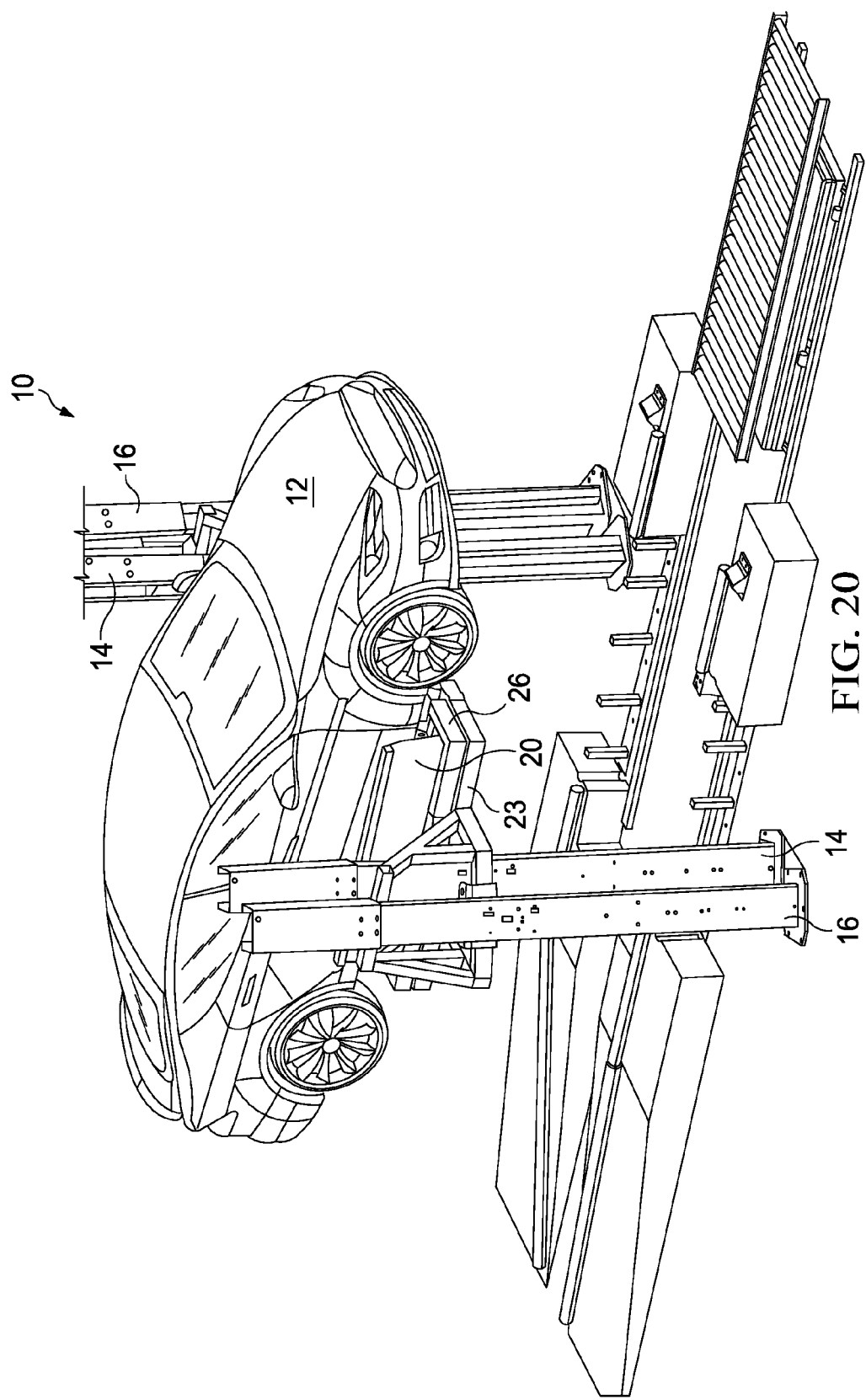
FIGS. 20-22 show that the battery lift has been raised until it touches the underside of the battery pack, so as to support the battery pack for removal.
Figure 21:
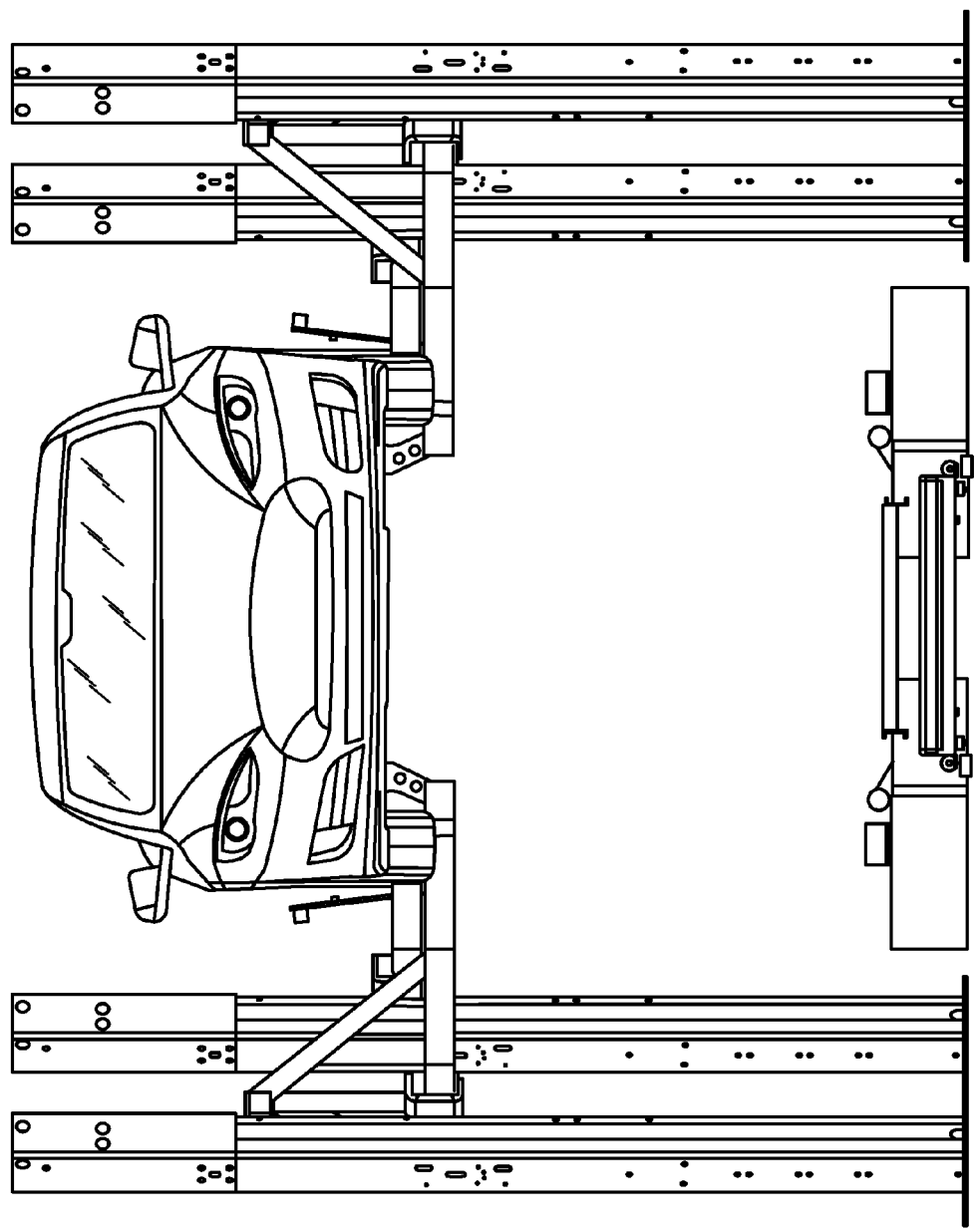
Figure 22:
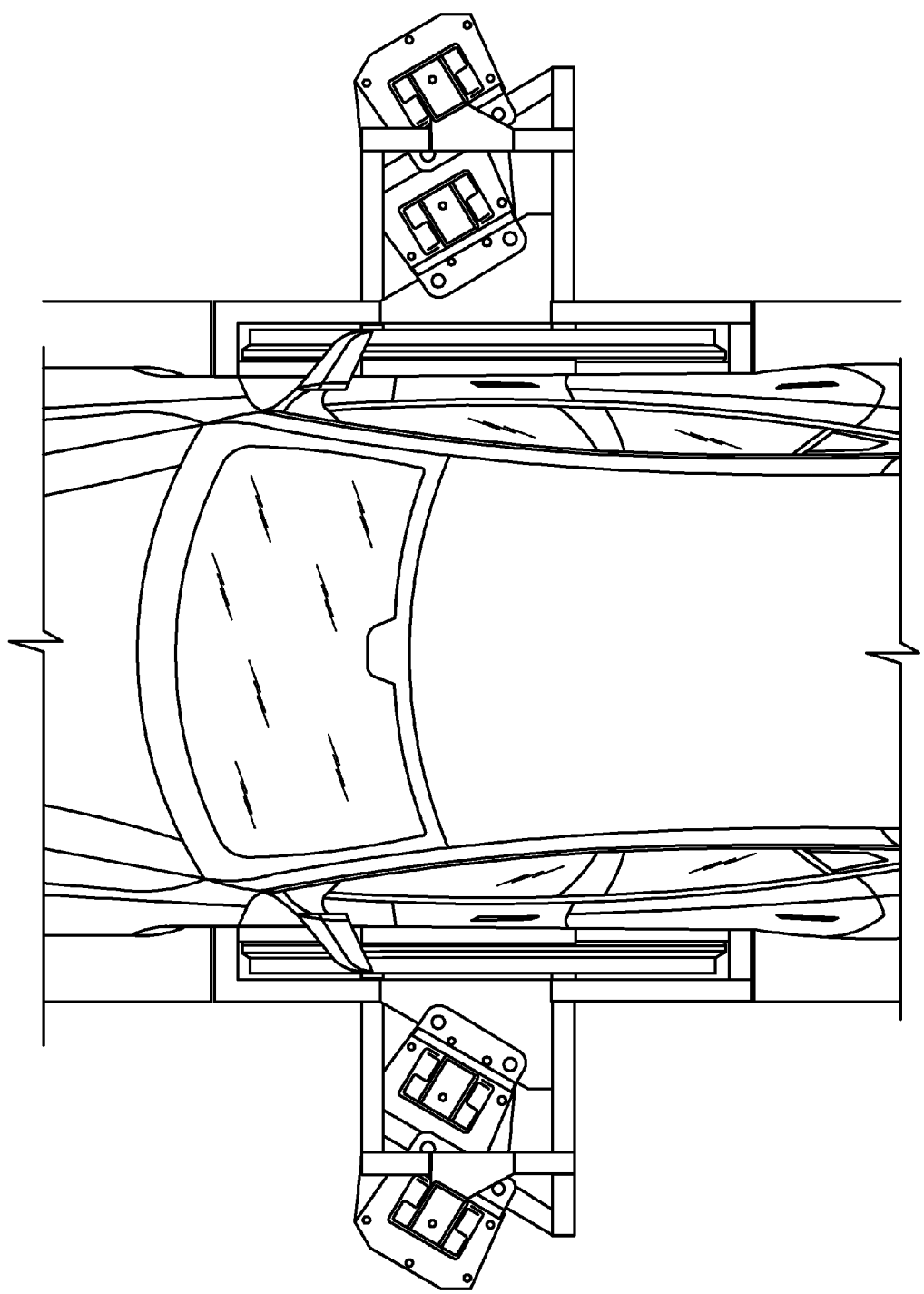
Figure 23:
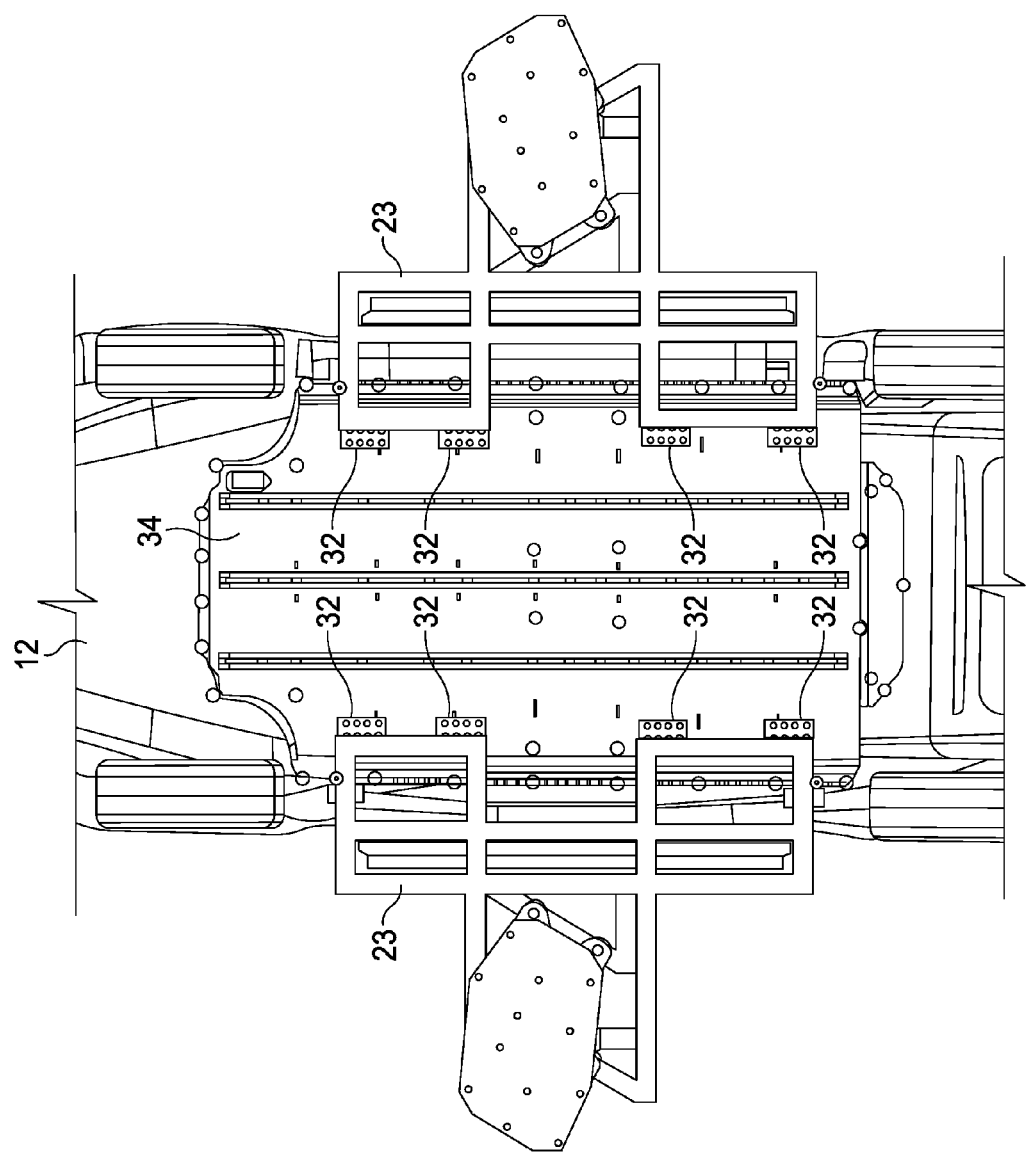
FIG. 23 shows that the battery lift can have ball transfer pads supporting the battery.

FIG. 19 shows that the system is ready to raise the battery lift (here, the outboard lifts 16). FIGS. 20-22 show that the battery lift has been raised until it touches the underside of the battery pack, so as to support the battery pack for removal. FIG. 23 shows that the battery lift can have ball transfer pads 32 supporting the battery 34 attached to and extending from battery support structures 23. As shown in FIGS. 19, 20 and 23, battery support structures 23 extend beneath vehicle 12 and battery 34, and around inboard lifts 14 (see also FIG. 11). FIG. 20 also shows horizontal doors 20 attached to support structures 23 and extending through lifting arms 26 of inboard lifts 14, and on either side of vehicle 12, once the battery lift has been raised. Lances can be inserted through openings in the lift frame to secure the battery to the lift.

Figure 24:
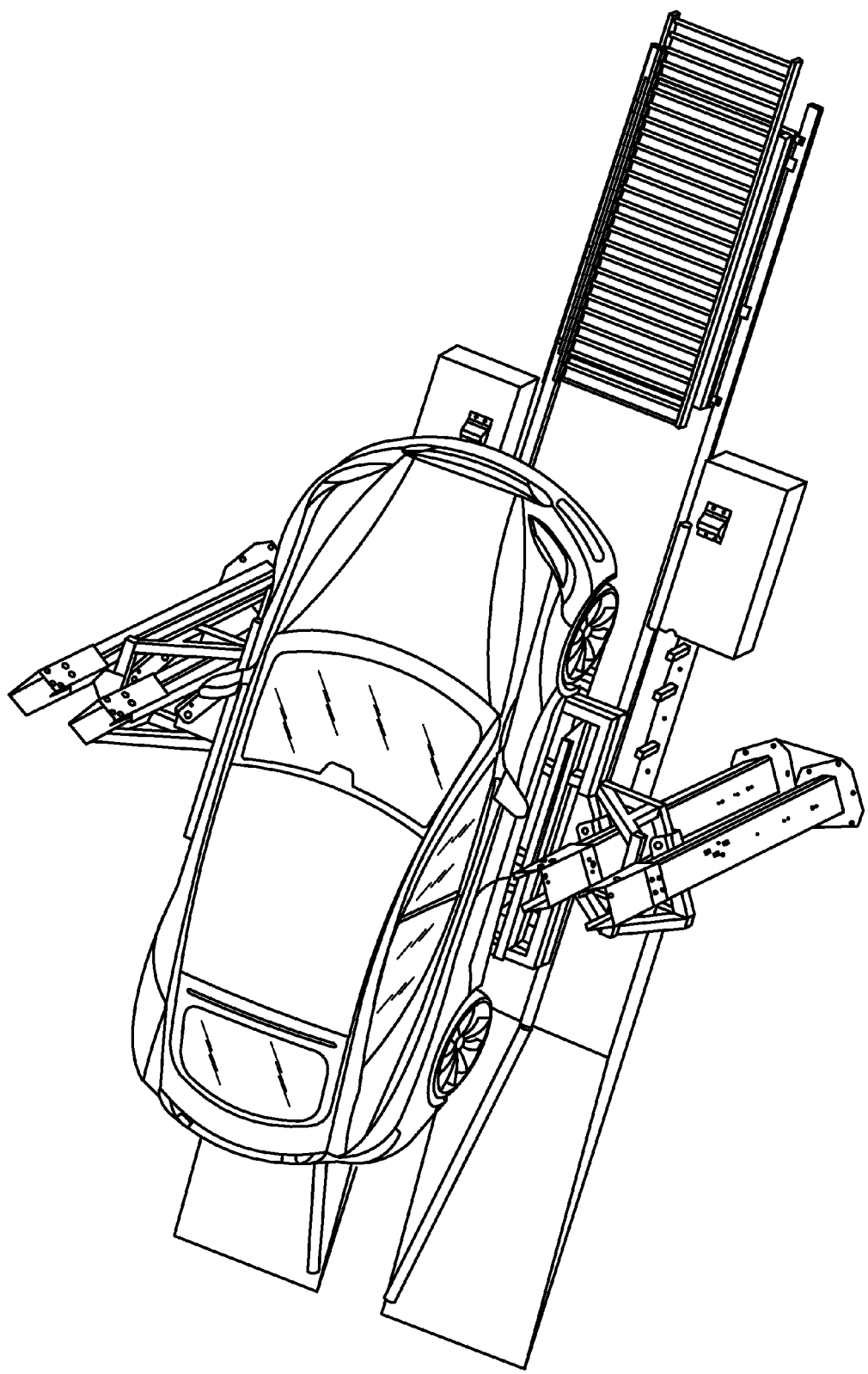
FIG. 24 shows that after the battery lift is correctly positioned to support the battery pack, fastener removal can begin.

FIG. 24 shows that after the battery lift is correctly positioned to support the battery pack, fastener removal can begin. In some implementations, this task is performed by human operators, for example using torque control devices (e.g., nutrunners) to remove bolts that secure the battery pack to the vehicle. In other implementations, automated equipment can be mounted on the battery lift (e.g., dedicated nutrunners for the respective bolt positions, or one or more robots that moves a nutrunner between at least two bolt positions).

Figure 25:
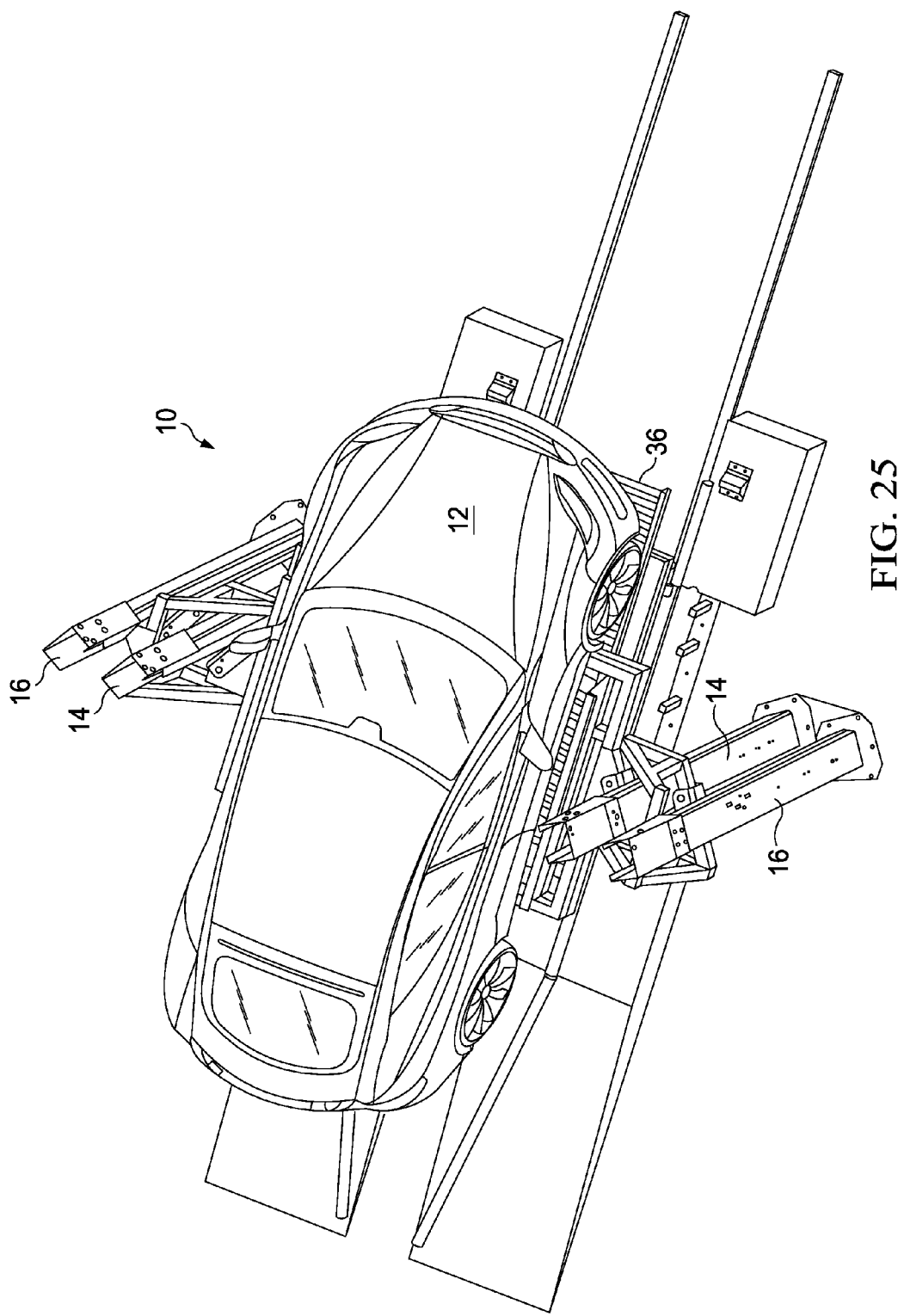
FIG. 25 shows that a battery conveyor shuttle is brought underneath the vehicle.
Figure 26:
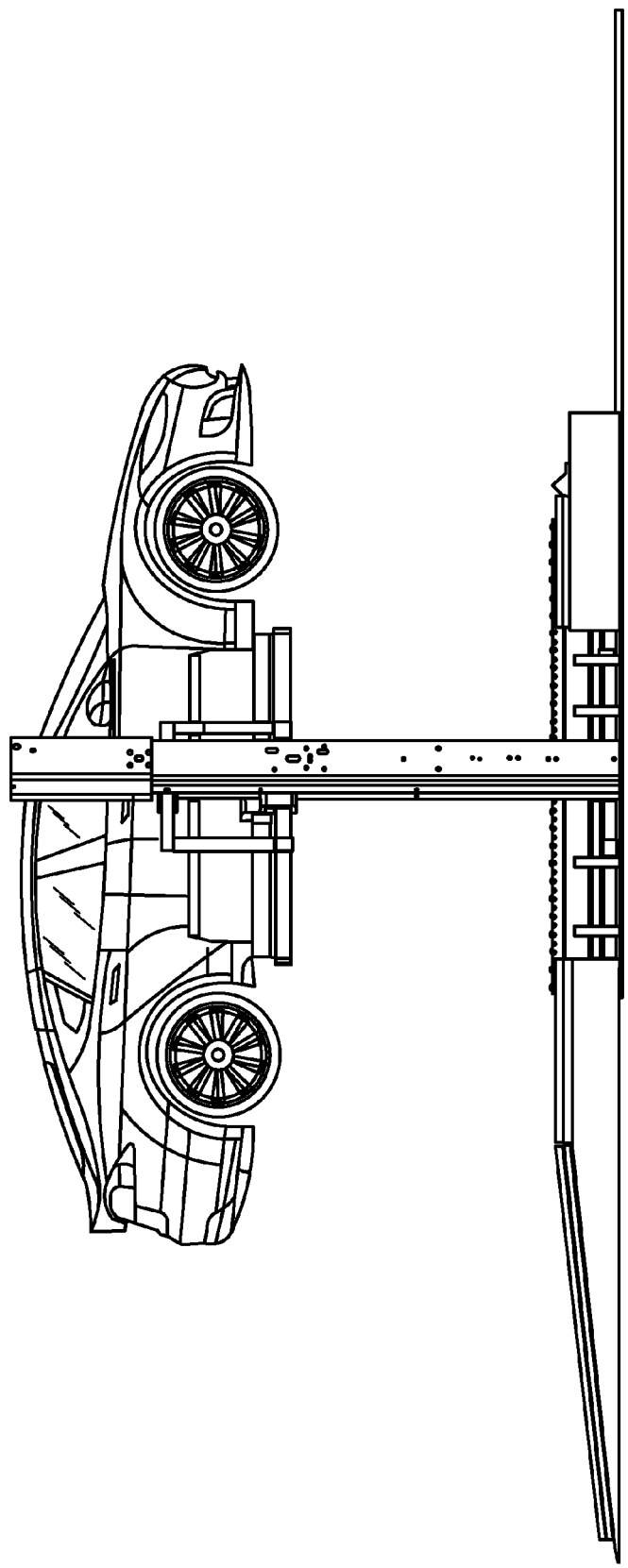
FIG. 26 shows that the system is ready to lower the battery (on the battery lift) onto the conveyor shuttle.
Figure 27:
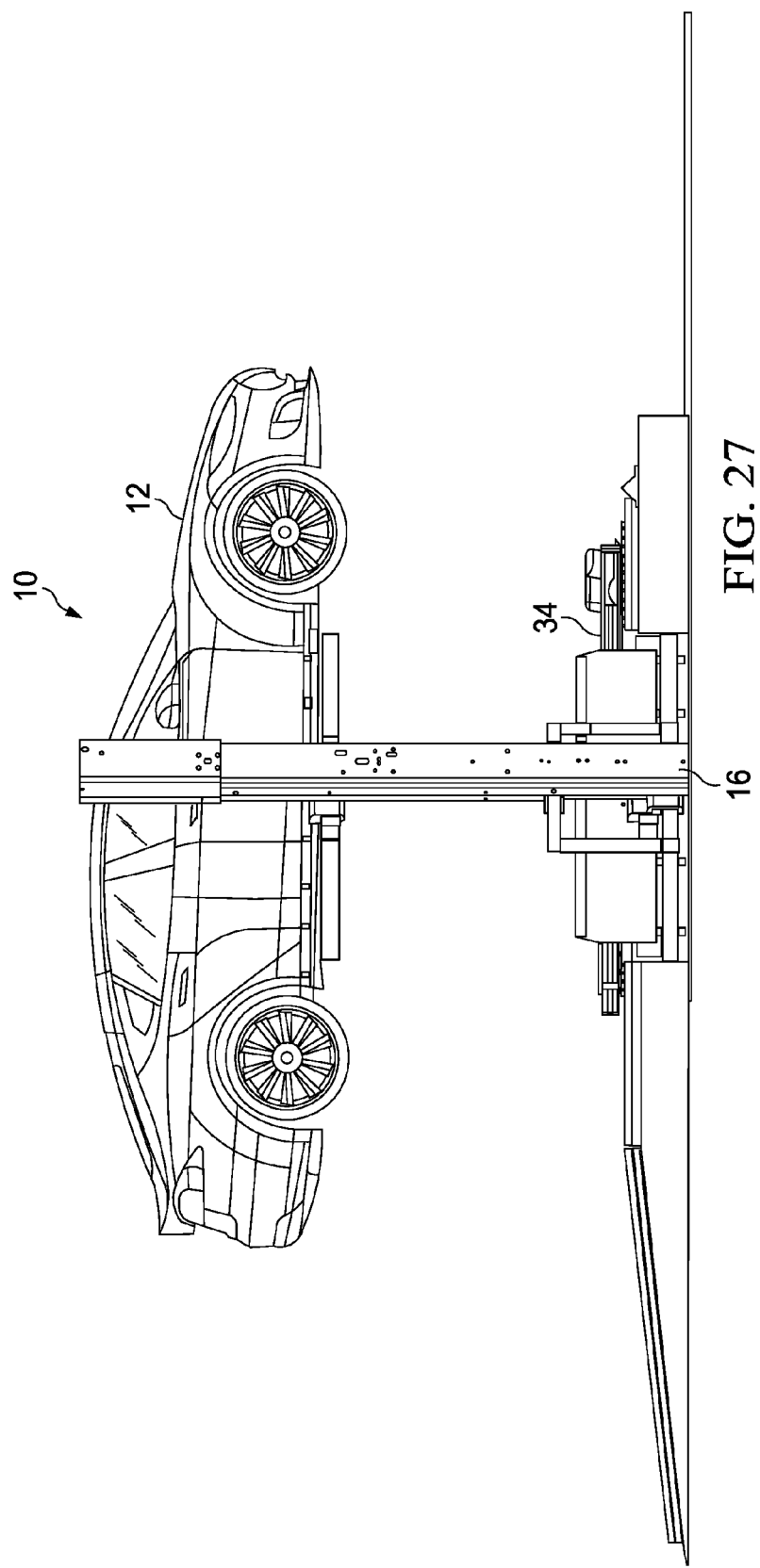
FIG. 27 shows that the battery lift with the battery has been lowered.

FIG. 25 shows that a battery conveyor shuttle 36 is brought underneath the vehicle. FIG. 26 shows that the system is ready to lower the battery (on the battery lift) onto the conveyor shuttle. FIG. 27 shows that the battery lift with the battery 34 has been lowered.

Figure 28:
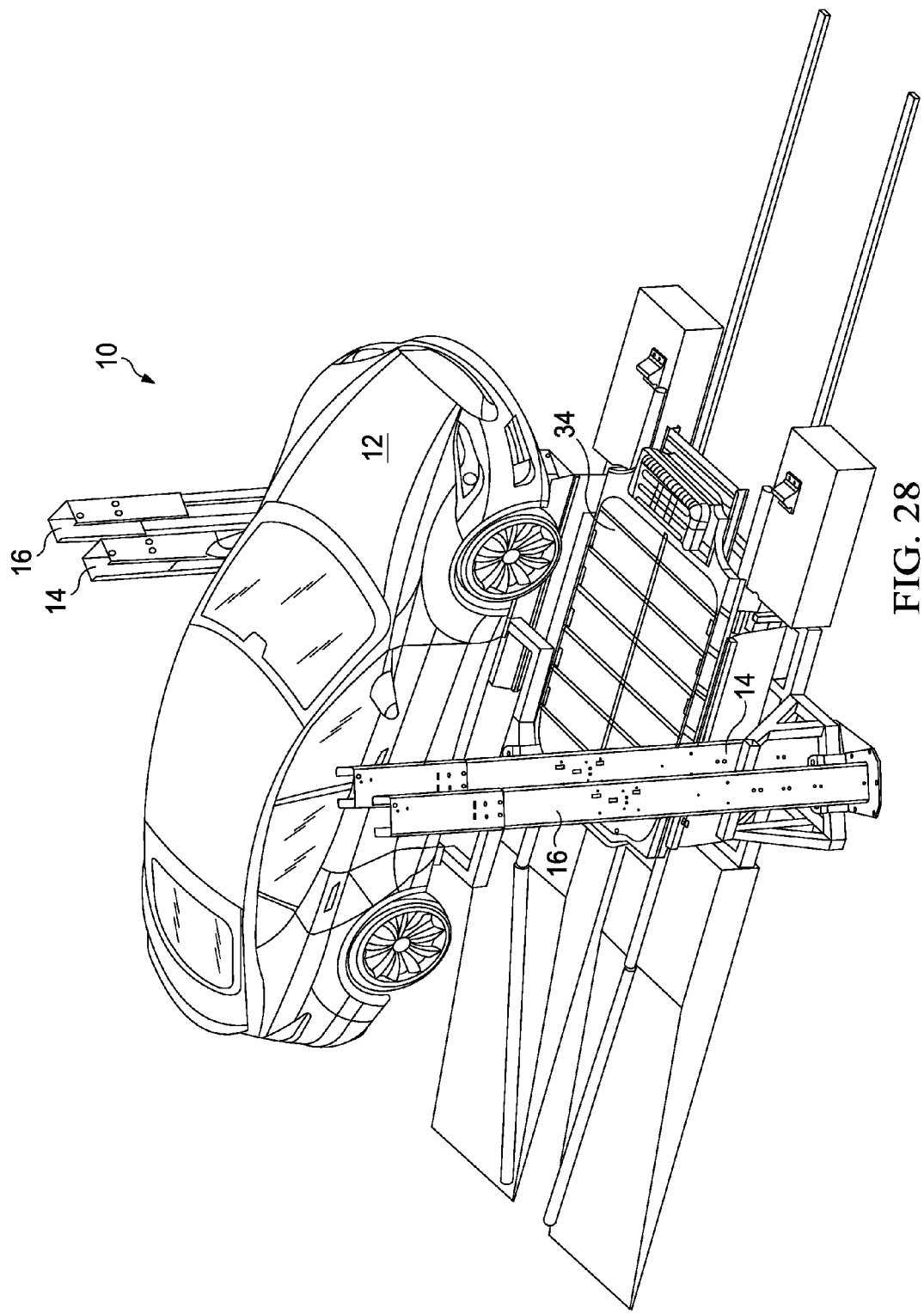
FIG. 28 shows that the system is ready to move the used battery away from the vehicle and bring in a fresh one.
Figure 29:
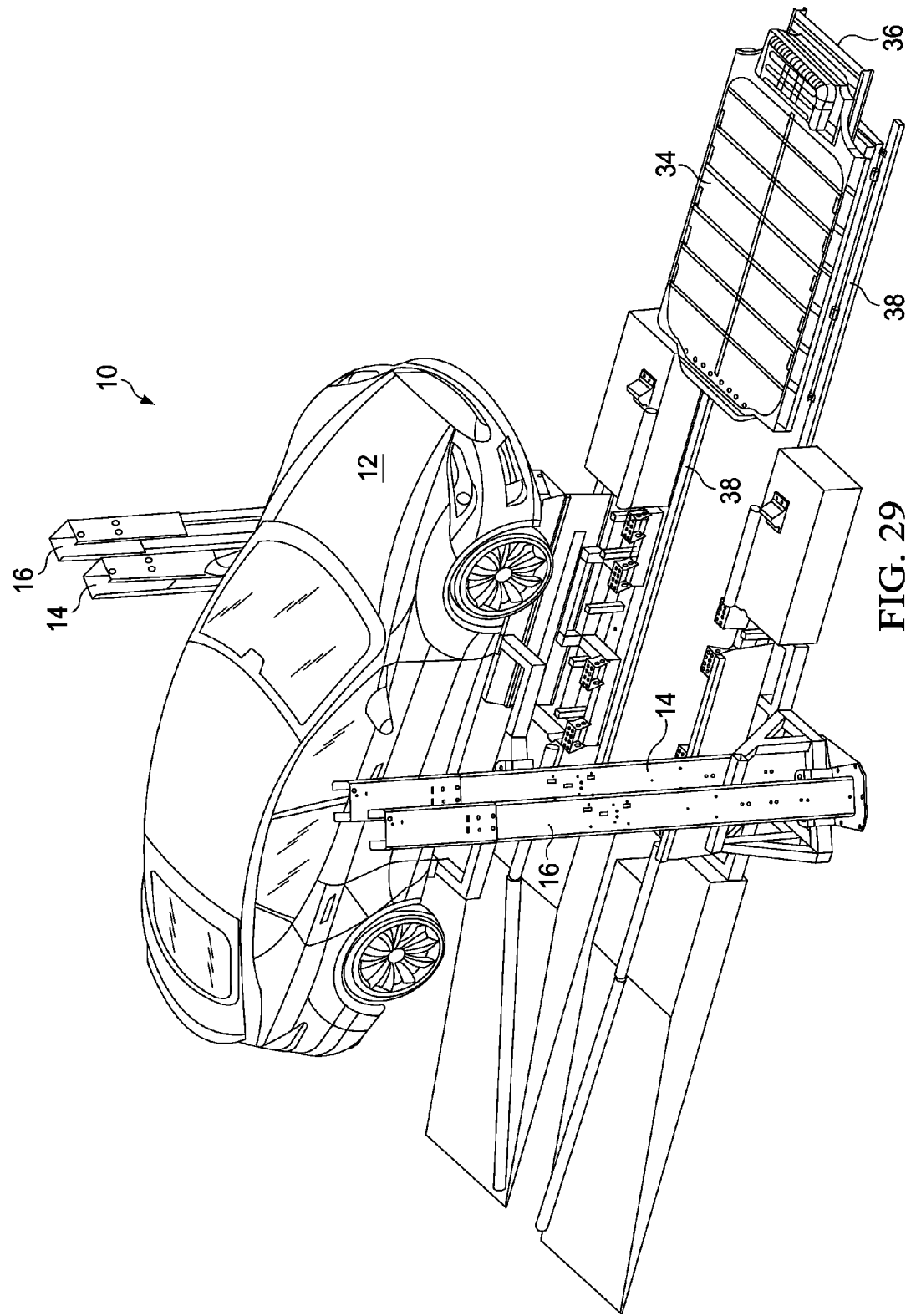
FIG. 29 shows that the used battery is being removed on the conveyor shuttle.
Figure 30:
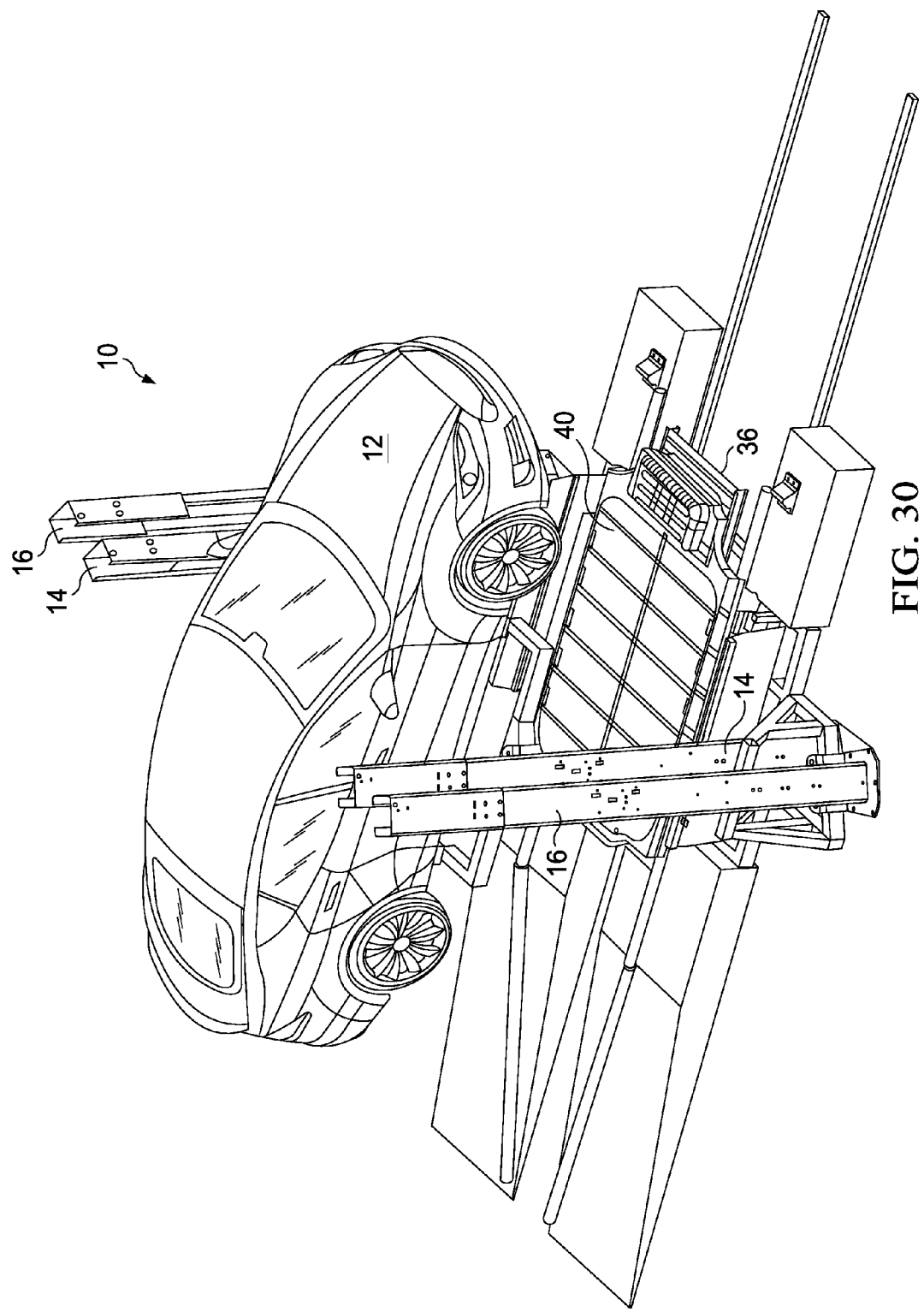
FIG. 30 shows that the fresh battery has been brought underneath the vehicle on a conveyor shuttle.

FIG. 28 shows that the system is ready to move the used battery 34 away from the vehicle 12 and bring in a fresh one. FIG. 29 shows that the used battery 34 is being removed on the conveyor shuttle 36. For example, the shuttle can have wheels that run on rails or other tracks 38 on the floor. The used battery is placed in a designated position for being recharged, and/or serviced as necessary, and stored until the next use. For example, the used battery can be transferred from the conveyor shuttle onto a scissor lift, such as using rollers on top of the shuttle and the lift. FIG. 30 shows that the fresh battery 40 has been brought underneath the vehicle on a conveyor shuttle 36. For example, the fresh battery 40 may earlier have been sitting on a scissor lift, and have been transferred from there onto the conveyor shuttle 36. The conveyor shuttle 36 for the fresh battery 40 can be the same shuttle as removed the used battery, or a separate shuttle.

Figure 31:
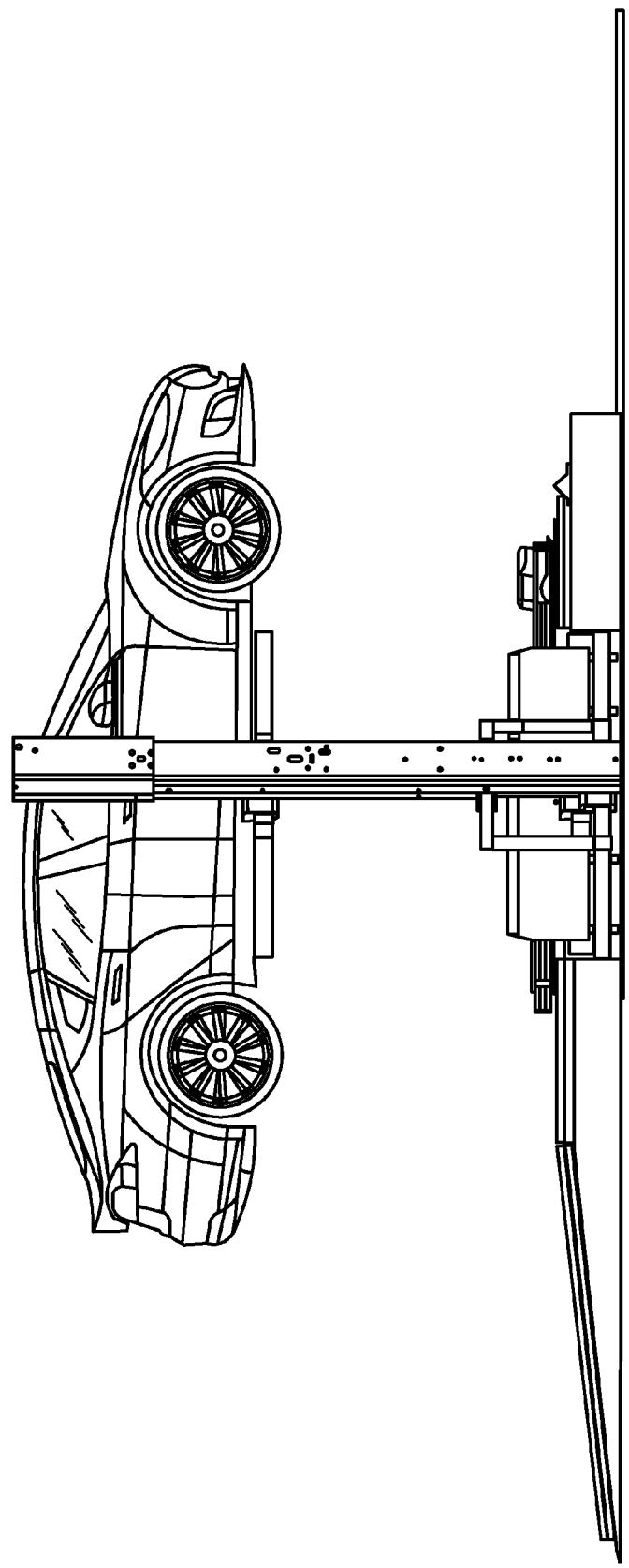
FIG. 31 shows that the system is ready to raise the fresh battery into the vehicle.
Figure 32:
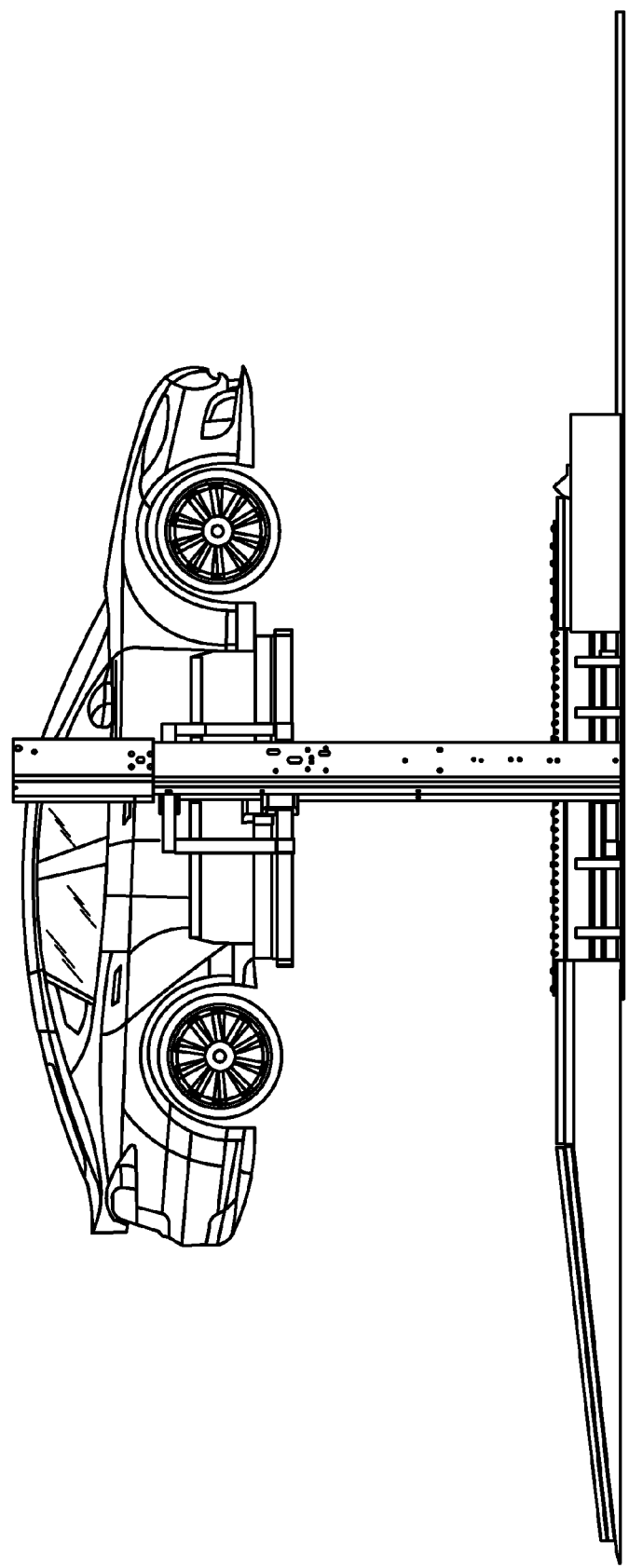
FIG. 32 shows that the fresh battery has been raised into contact with the vehicle.
Figure 33:
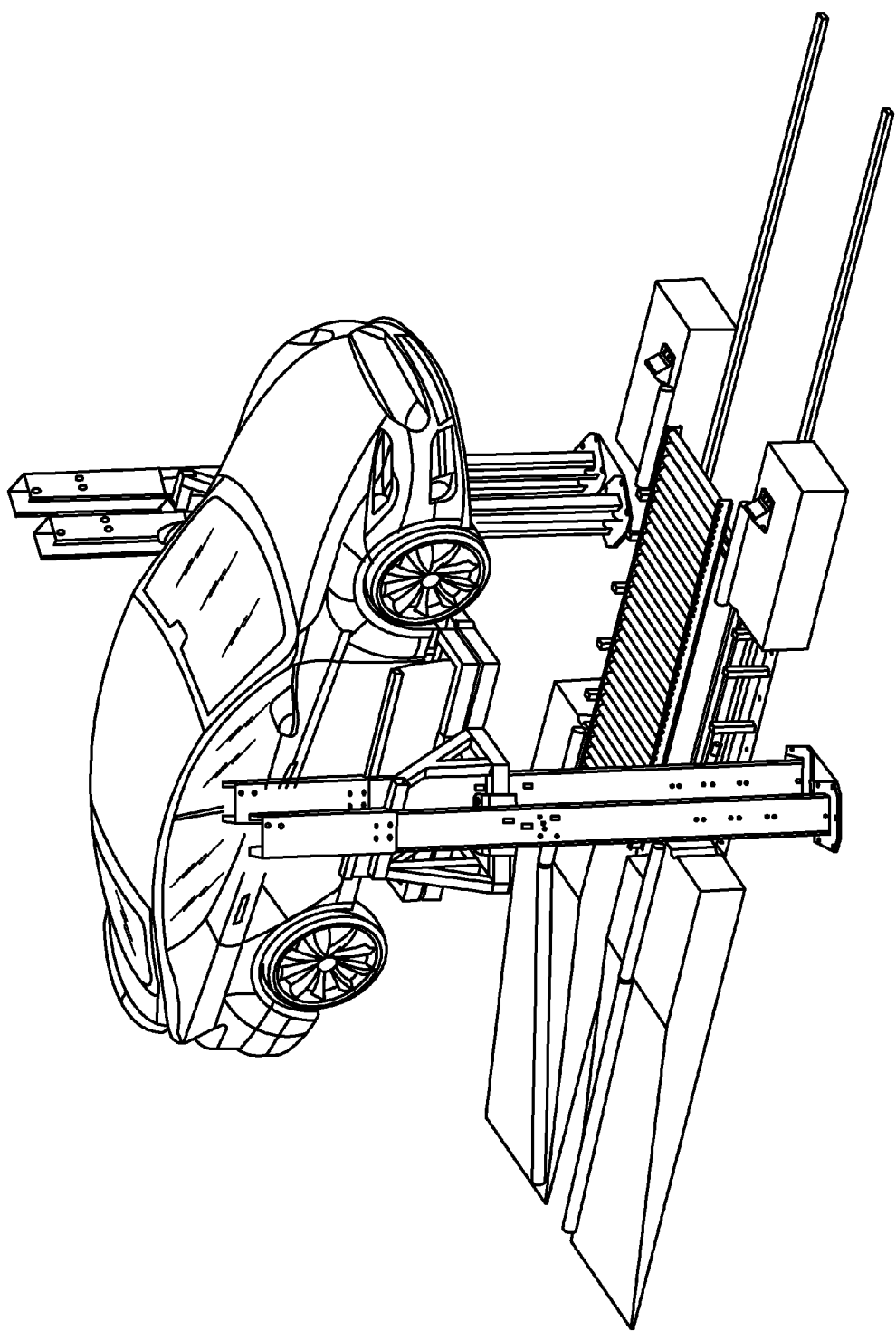
FIG. 33 shows that the system is ready to return the conveyor shuttle to the staged position.
Figure 34:
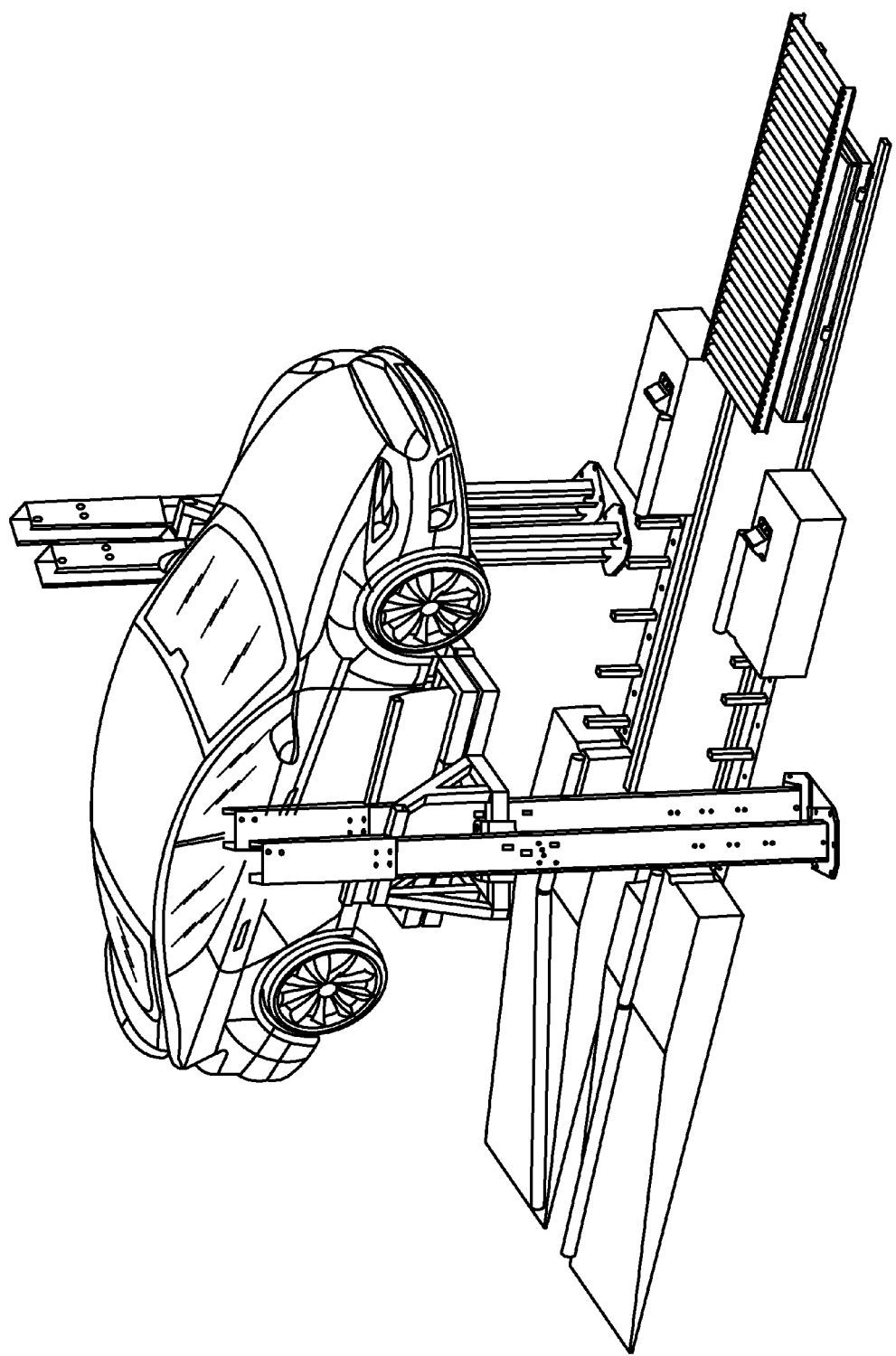
FIG. 34 shows that the shuttle is being so returned.

FIG. 31 shows that the system is ready to raise the fresh battery into the vehicle. FIG. 32 shows that the fresh battery has been raised into contact with the vehicle. FIG. 33 shows that the system is ready to return the conveyor shuttle to the staged position, and FIG. 34 shows that the shuttle is being so returned.

Figure 35:
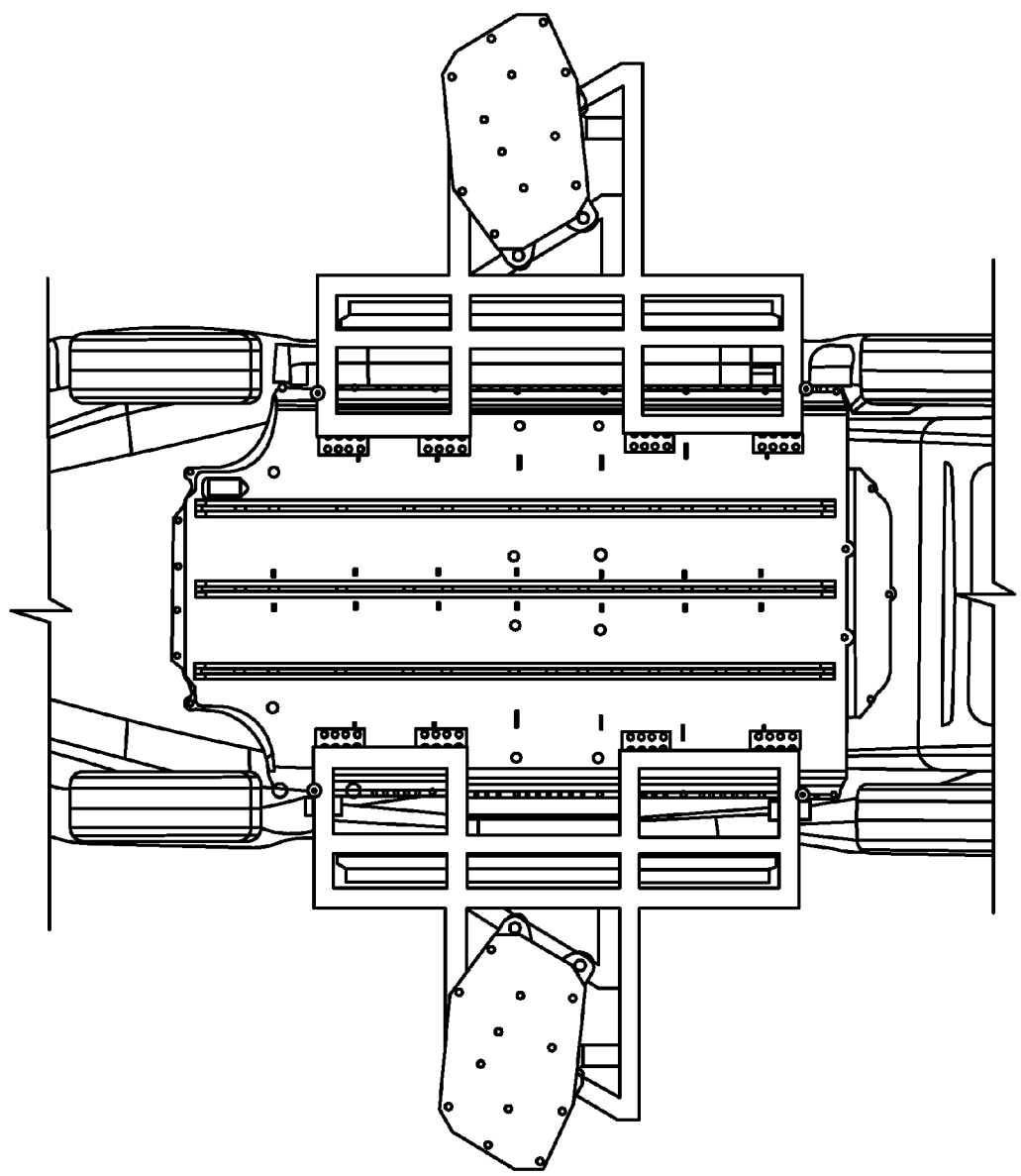
FIG. 35 shows that the fresh battery is being supported by the ball transfer pads.
Figure 36:
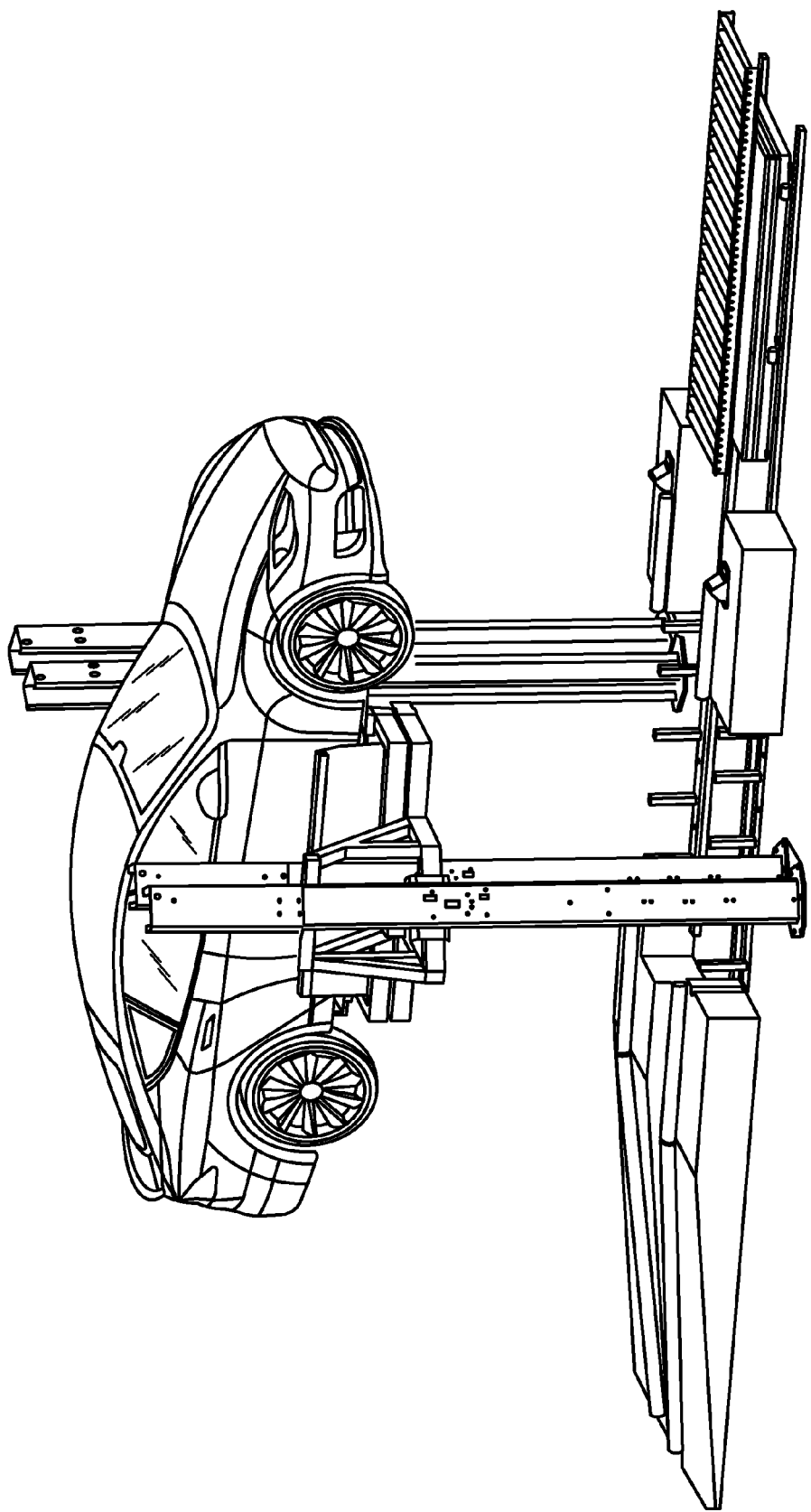
FIG. 36 shows that the battery pack fasteners (e.g., bolts) are fastened (e.g., torqued to specifications).

FIG. 35 shows that the fresh battery is being supported by the ball transfer pads. Lances can be used to align the battery with the rest of the vehicle (here referred to as body-in-white, or BIW). FIG. 36 shows that the battery pack fasteners (e.g., bolts) are fastened (e.g., torqued to specifications). For example, this can be done by one or more human operators, or by automated equipment.

Figure 37:
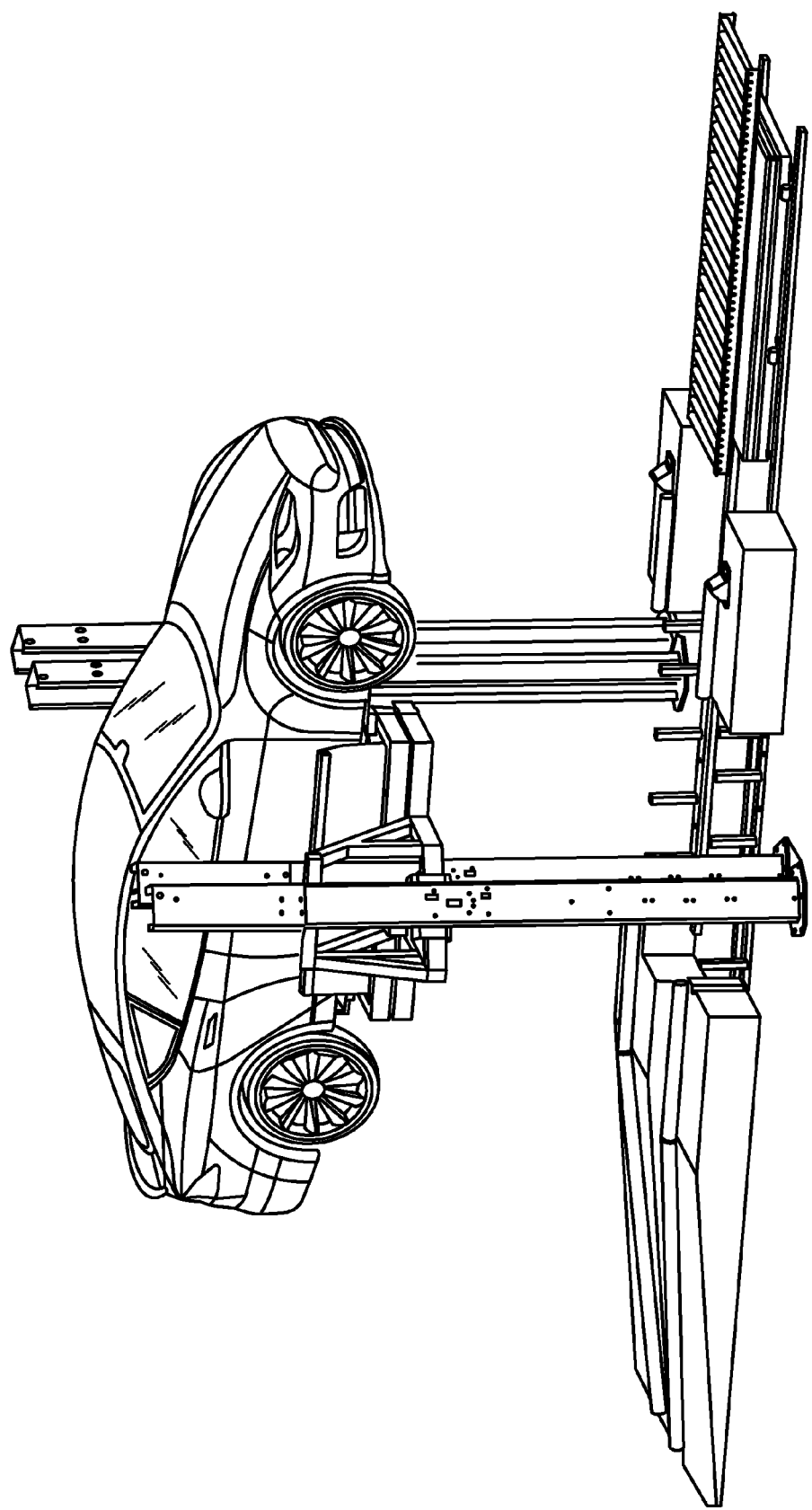
FIG. 37 shows that the system is ready to lower the battery lift.
Figure 38:
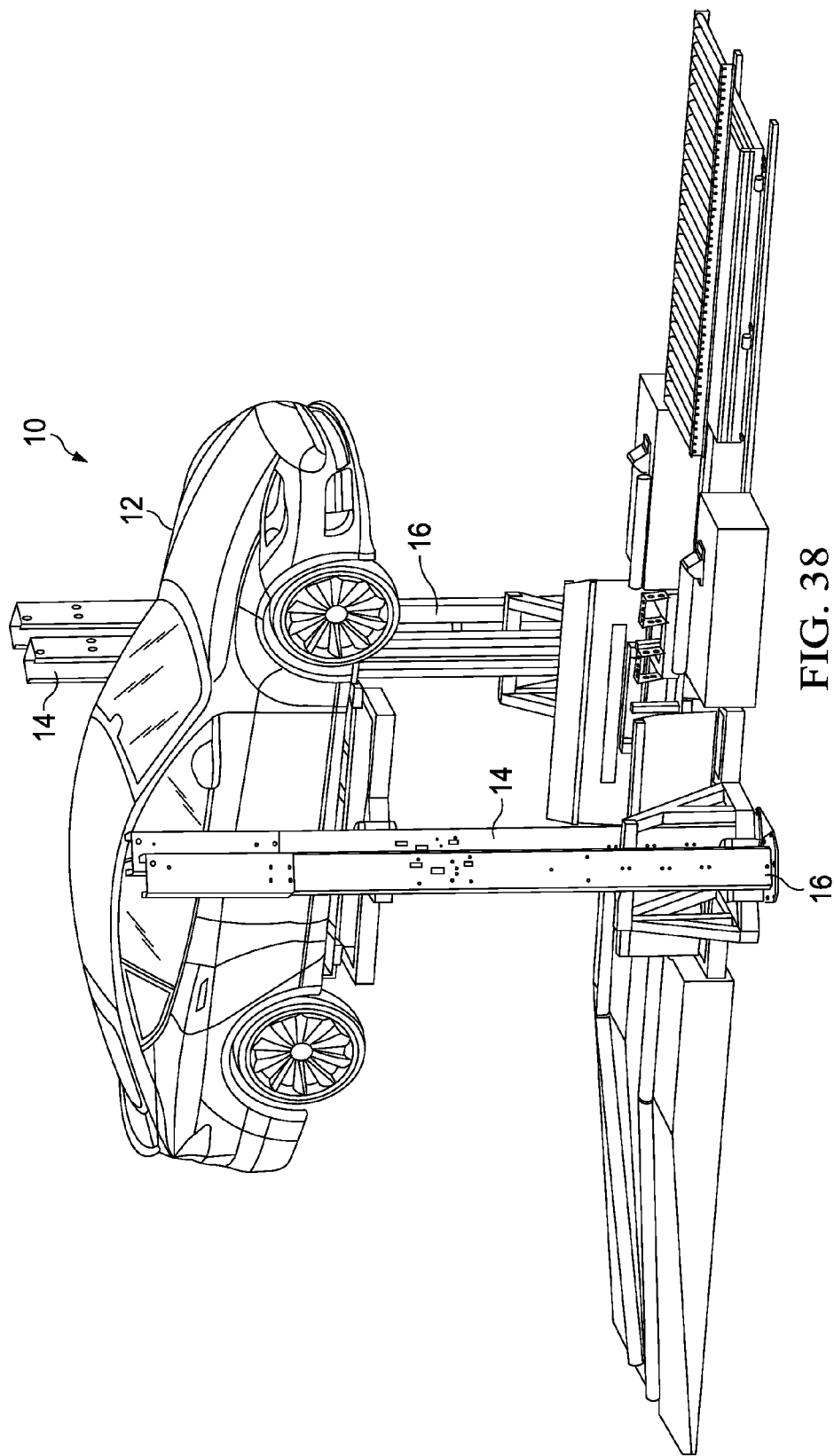
FIG. 38 shows that the battery lift has been lowered.
Figure 39:
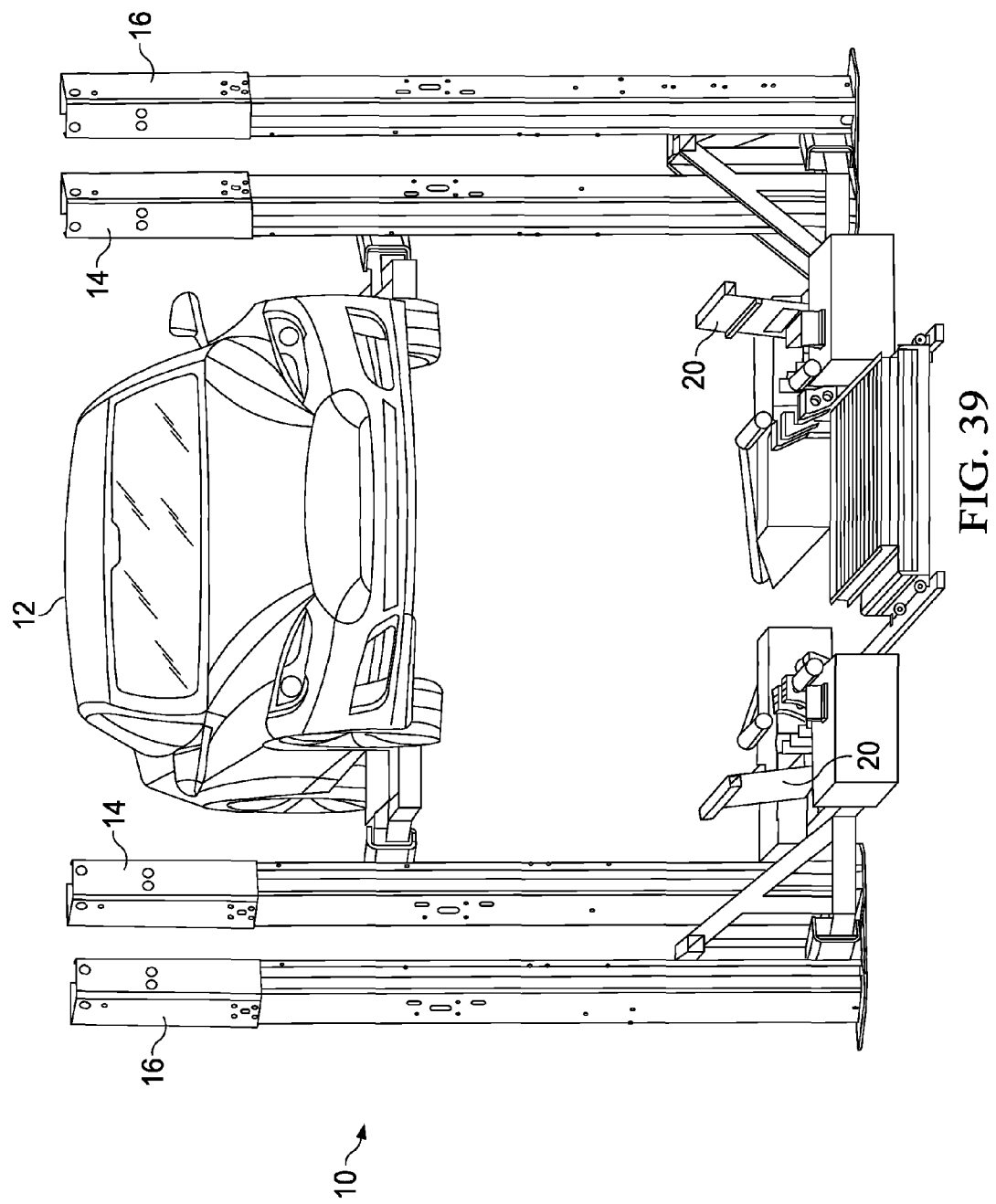
FIG. 39 shows that the system is ready to close the battery lift doors.
Figure 40:
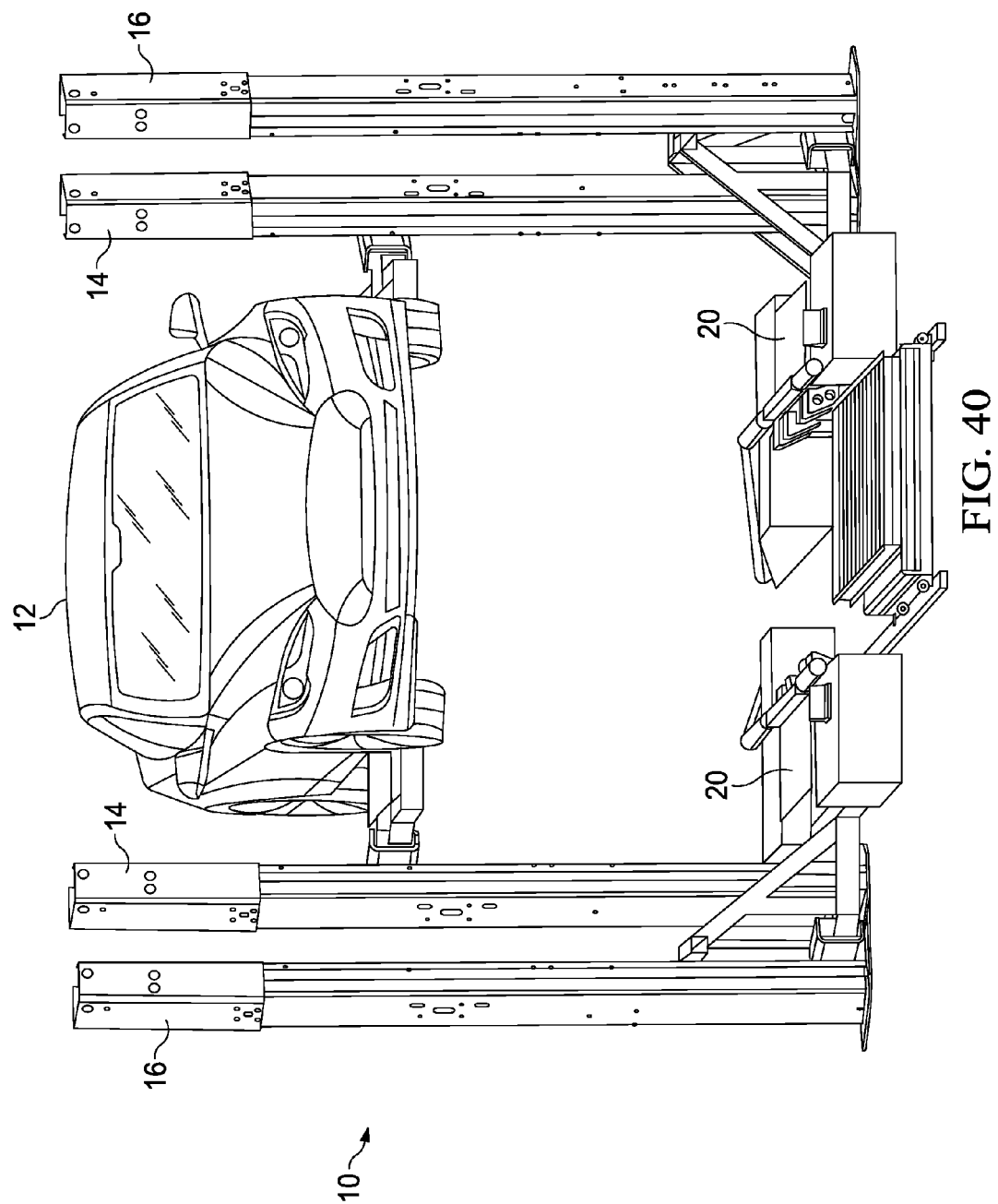
FIG. 40 shows that the battery lift doors have been closed.

FIG. 37 shows that the system is ready to lower the battery lift. FIG. 38 shows that the battery lift (outboard lifts 16) has been lowered. FIG. 39 shows that the system is ready to close the horizontal doors (also known as battery lift doors) 20. FIG. 40 shows that the battery lift doors 20 have been closed.

Figure 41:
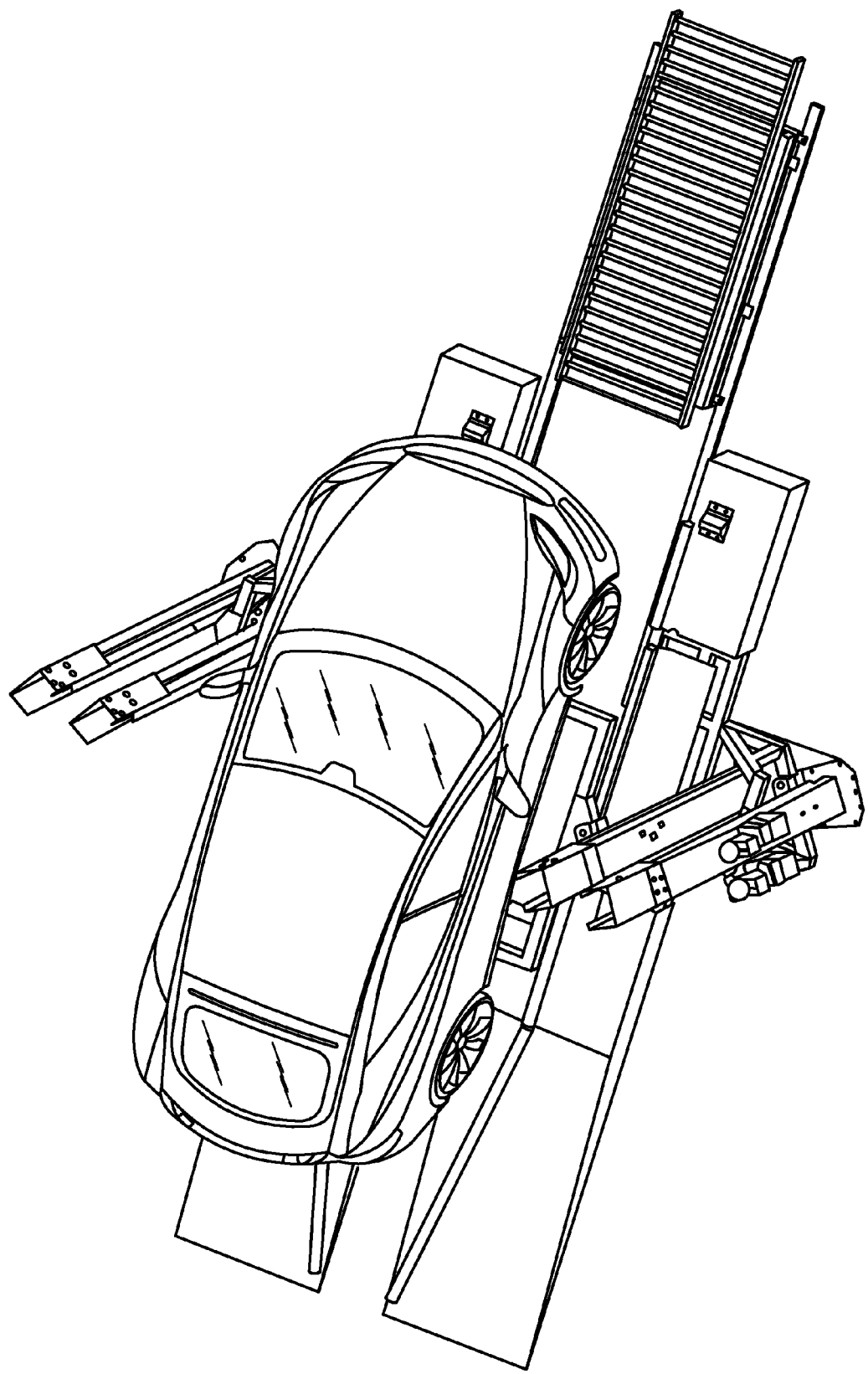
FIG. 41 shows that the system is ready to lower the vehicle lift.
Figure 42:
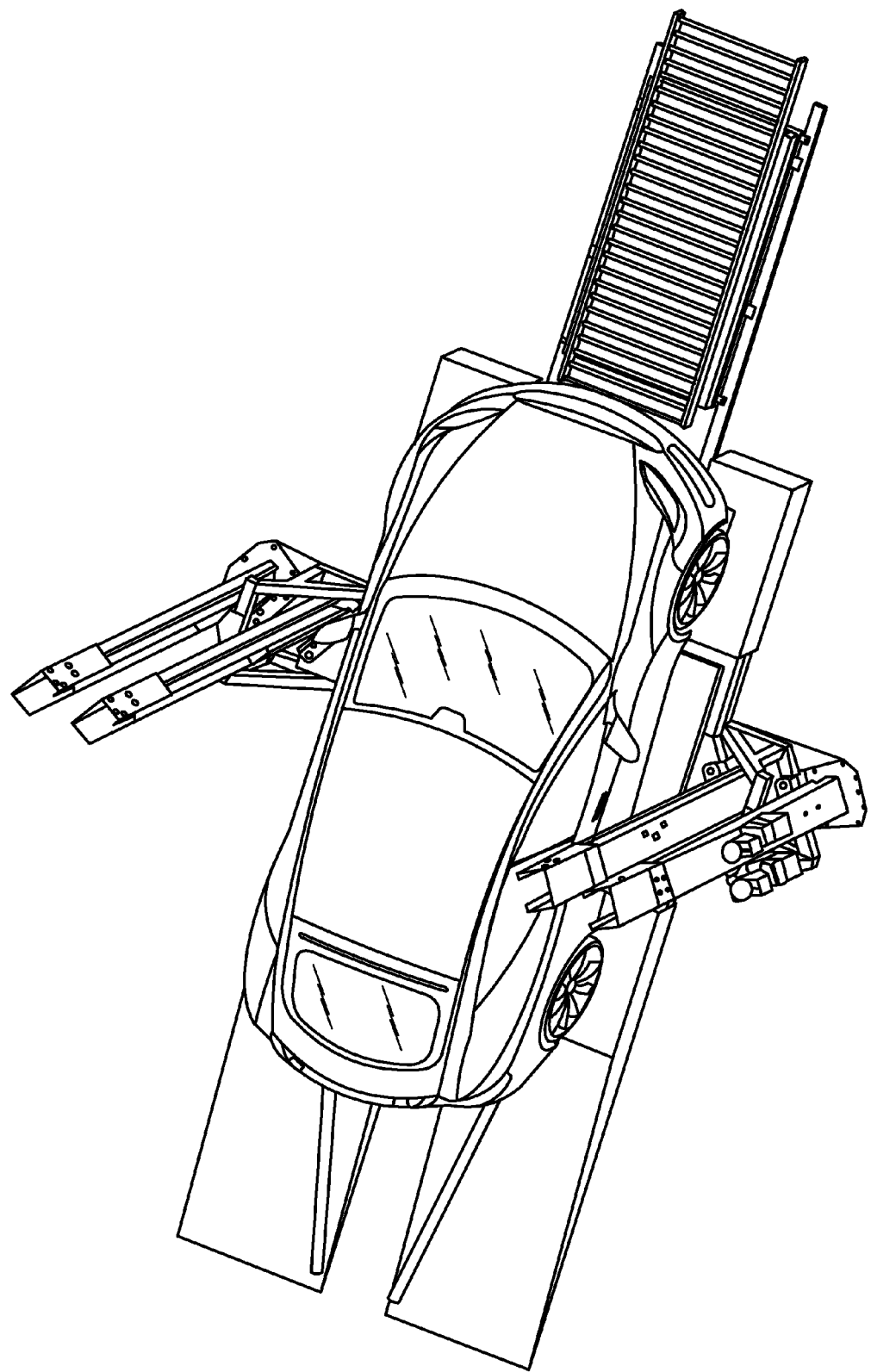
FIG. 42 shows that the vehicle lift has been lowered.
Figure 43:
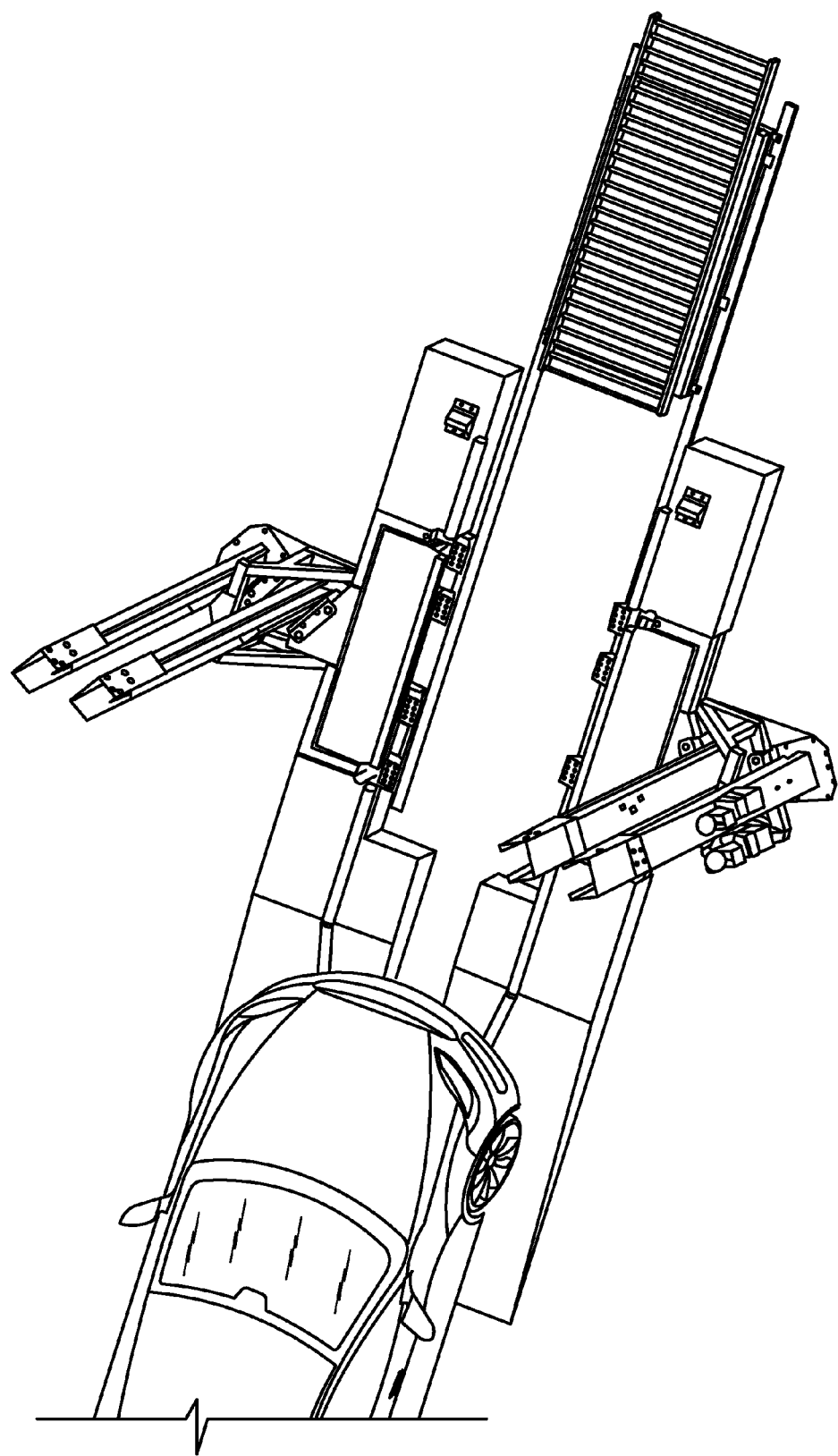
FIG. 43 shows that after having been lowered, the vehicle can turn on its power and the status of various systems in the vehicle can be confirmed (e.g., a 12V system and a high-voltage system).
Figure 44:
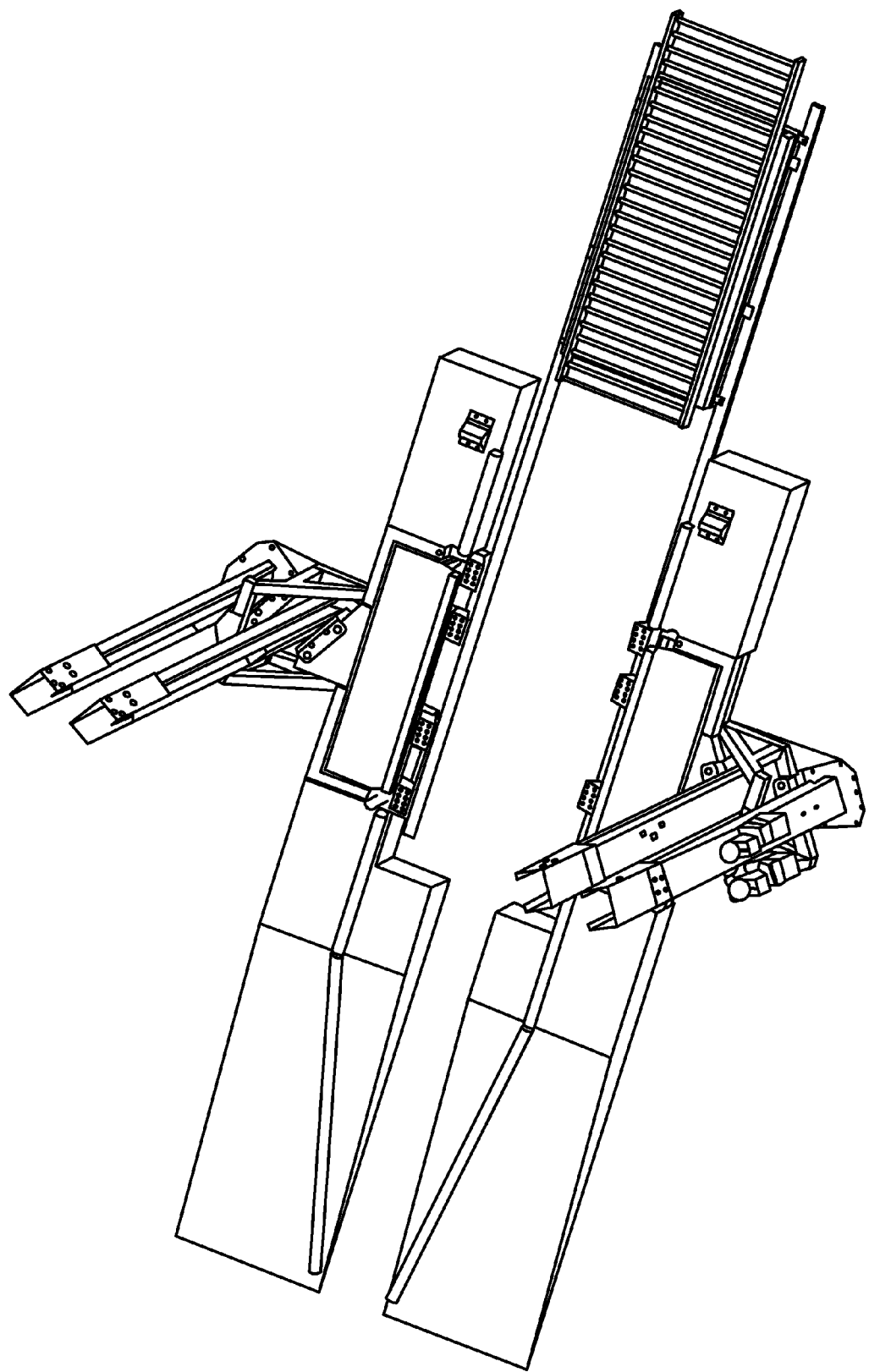
FIG. 44 shows the state of the system after a swap has been completed and before the next vehicle enters, which can be serviced using the same or a similar procedure.

FIG. 41 shows that the system is ready to lower the vehicle lift. FIG. 42 shows that the vehicle lift has been lowered. FIG. 43 shows that after having been lowered, the vehicle can turn on its power and the status of various systems in the vehicle can be confirmed (e.g., a 12V system and a high-voltage system). The vehicle can exit the changing station in reverse, opposite to the direction of entry. FIG. 44 shows the state of the system after a swap has been completed and before the next vehicle enters, which can be serviced using the same or a similar procedure.

Figure 45:
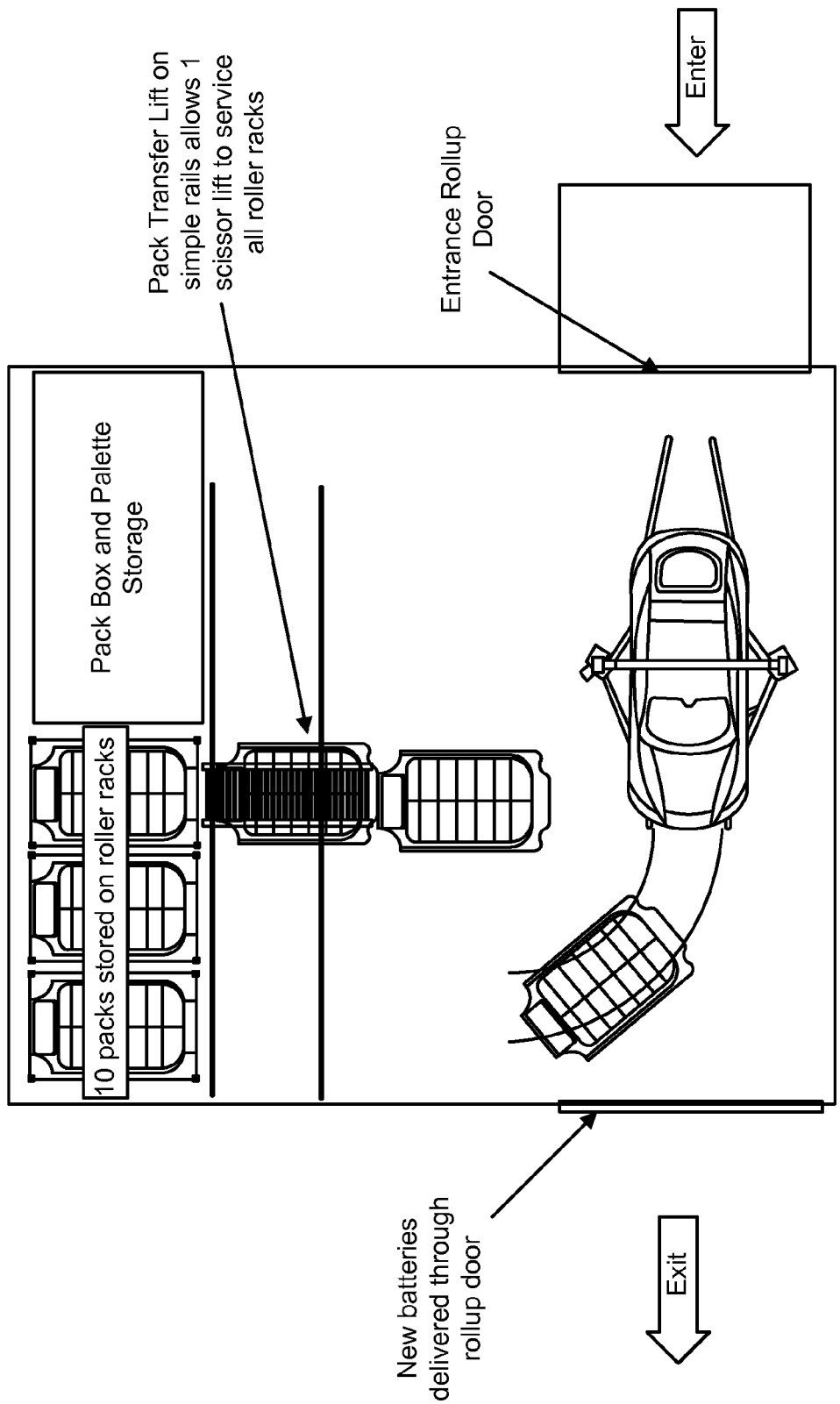
FIG. 45 shows that the station can have an entrance door, a vehicle lift mechanism inside the building, and an exit door.
Figure 46:
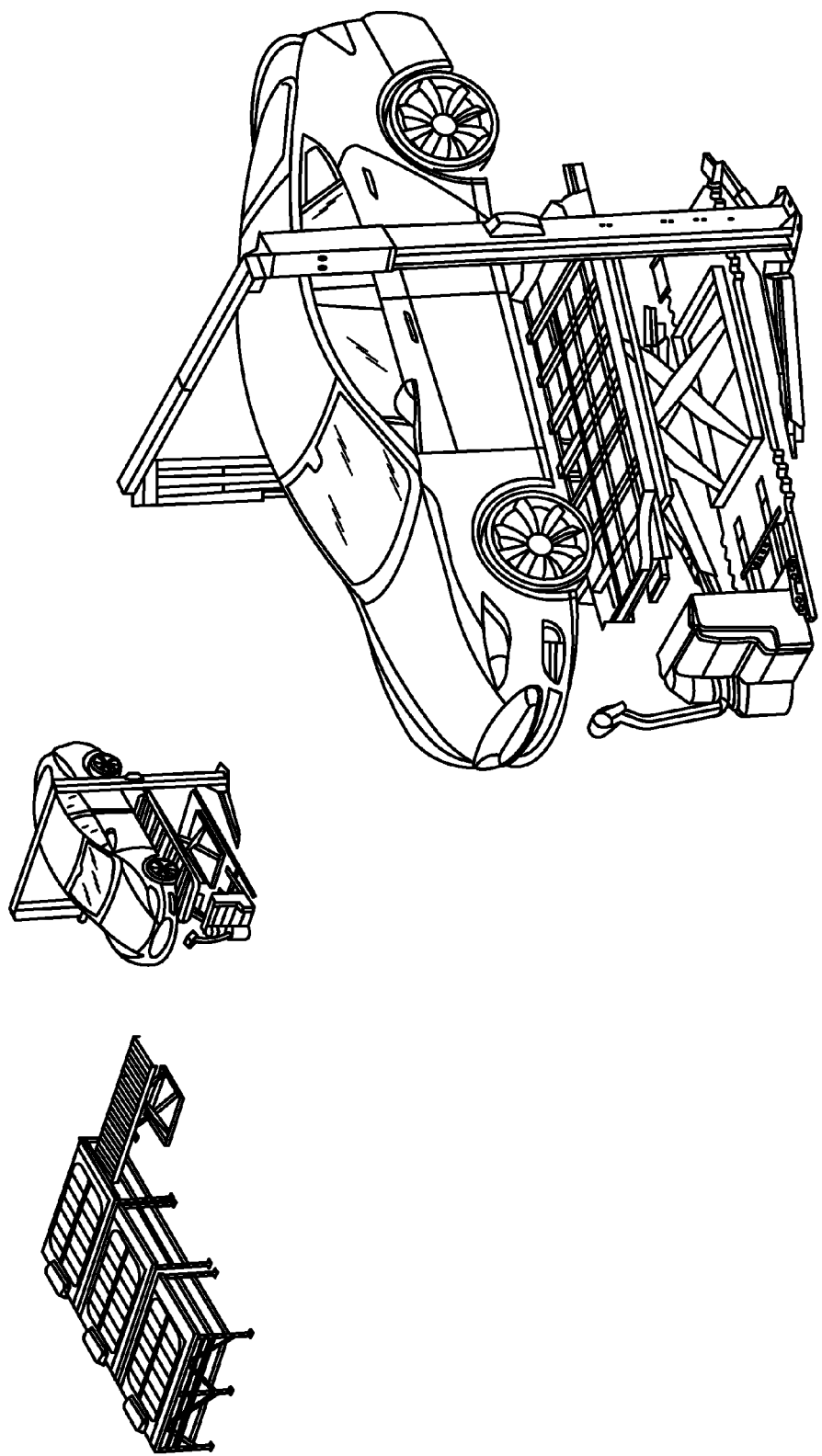
FIG. 46 shows that a forklift can be used to raise and lower the battery pack.
Figure 47:
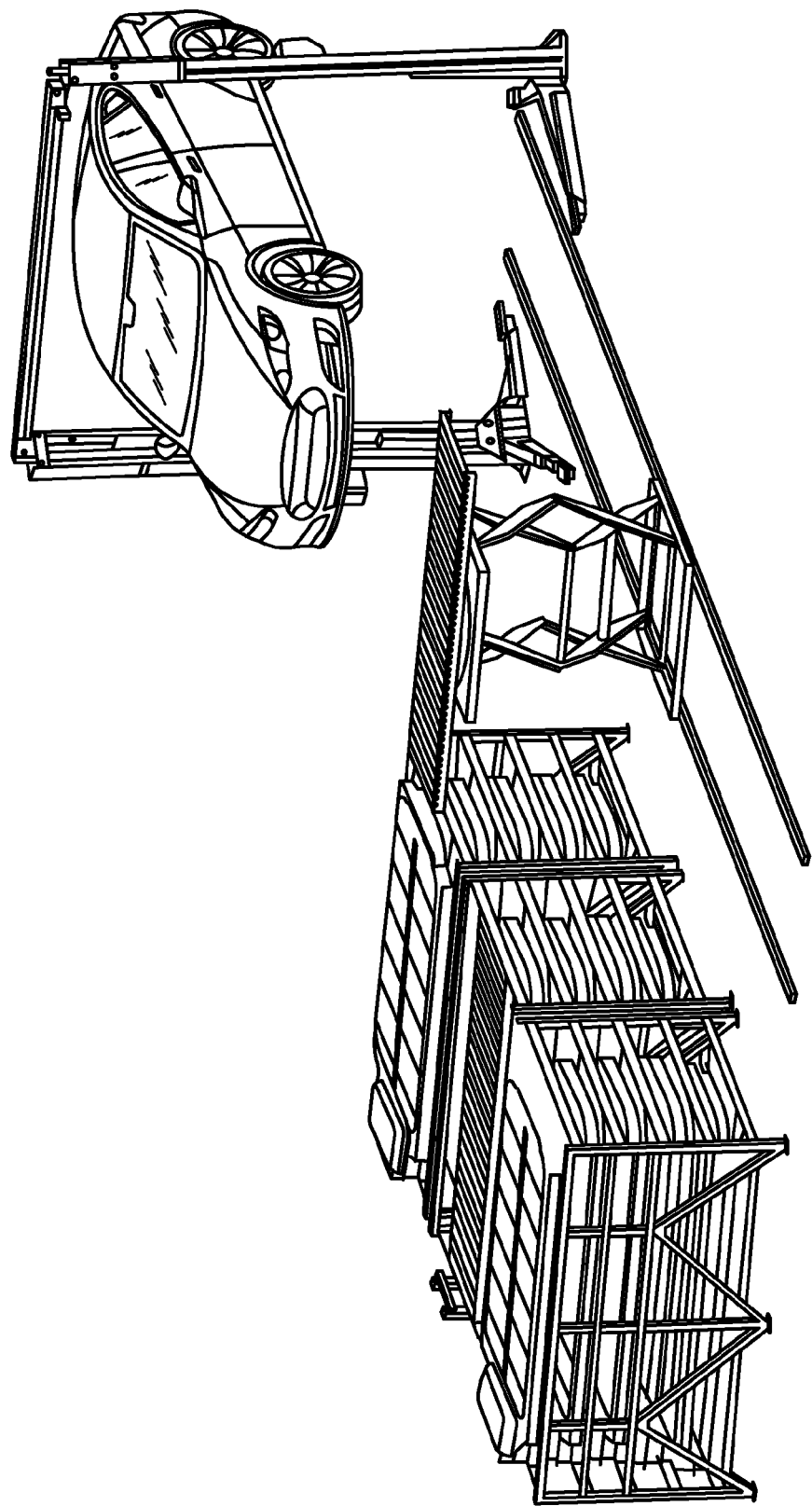
FIG. 47 shows that a moving device for battery packs can be positioned on rails in order to move between battery storage and the serviced vehicle.

FIGS. 45-47 show examples relating to a battery swapping station. FIG. 45 shows that the station can have an entrance door, a vehicle lift mechanism inside the building, and an exit door. Battery packs (used as well as fresh) can be stored on a rack. A scissor lift can bring battery backs between the vehicle and a pack transfer lift, which services the roller racks. FIG. 46 shows that a forklift can be used to raise and lower the battery pack. FIG. 47 shows that a moving device for battery packs can be positioned on rails in order to move between battery storage and the serviced vehicle. The device can have a turntable on top to provide rotation of the battery pack, as needed.

Lowering the battery pack can disconnect one or more couplings. One or more other disconnects can be used in some implementations. For example, separate quick disconnects can be used for respective high-voltage connection, low-voltage connection and a coolant connection. When the battery pack is successfully mounted onto the vehicle, any quick disconnects on the vehicle are then properly connected with corresponding disconnects on the new battery pack. This can ensure proper connection of high voltage, low voltage and liquid coolant to the vehicle. For example, the vehicle's internal system can check whether there is any water intrusion into the battery pack, or whether there are any short circuits. If no errors are detected, the system can close a connect that supplies the high voltage to the vehicle.

In some implementations, there is no direct communication by the battery-swapping system with the vehicle's internal computer systems. For example, when the vehicle is placed in Park mode and the battery pack is removed, the vehicle may present (e.g., display) a message to the user to obtain a service inspection. When the battery is restored (e.g., by swapping in a new battery), and the power is cycled on, the car can recognize that valid high-voltage power is available and can enter a normal operating mode. However, in other implementations, the battery-swapping system can communicate with the vehicle system(s) to remove such error signals. For example, the vehicle's detection whether proper power is available can be temporarily disabled.

In some implementations, two or more types of battery packs can be serviced by the battery-swapping system. For example, such battery pack types can have a common external form factor and equivalent quick disconnects, but may have different energy capacity.

A battery-swapping system can be implemented on top of a trailer for increased mobility. Generally, the battery-swapping operations should be performed in an enclosed or at least covered location. For example, a trailer can be custom built with sides that pop out for increased space, and ramps on either side so the vehicle can be driven in and out of the battery-swapping facility.

Depleted batteries can be charged at the location of the swapping system (e.g., using grid power or other electric resource) or fully charged battery packs can be delivered to the location.

A number of implementations have been described as examples. Nevertheless, other implementations exist and are covered by the following claims.

What is claimed is:

1. A method of exchanging an electrical energy storage system (EESS) in an electric vehicle, the method comprising:

positioning an electric vehicle in x and y directions on an EESS exchange station, wherein the x direction relates to a direction of travel of the electric vehicle and the y direction is perpendicular to the x direction in a horizontal plane, and wherein the EESS exchange station included first lifts positioned on either side of the electric vehicle in the y direction and second lifts positioned on either side of the electric vehicle in the y direction and outside of the first lifts in the y direction relative to the electric vehicle, the second lifts including battery support structures extending around the first lifts and beneath the vehicle;

after positioning, raising the electric vehicle to a predetermined height using the first lifts;

after raising the electric vehicle, raising the second lifts toward the electric vehicle until the second lifts are correctly positioned relative to a first EESS; after raising the second lifts, unfastening the first EESS from the electric vehicle;

placing an EESS conveyor underneath the first EESS;

after placing the EESS conveyor, lowering the first EESS onto the EESS conveyor using the second lifts;

after lowering the first EESS, removing the first EESS and thereafter placing a second EESS underneath the electric vehicle;

after placing the second EESS underneath the electric vehicle, raising the second EESS toward the electric vehicle using the second lifts until the second EESS is correctly positioned relative to the electric vehicle;

after raising the second EESS, fastening the second EESS onto the electric vehicle; and after fastening the second EESS, lowering the electric vehicle using the first lifts.

2. The method of claim 1, wherein the electric vehicle rolls over horizontal doors while entering the EESS exchange station, wherein the horizontal doors cover the battery support structures, and wherein at least one tube is positioned on each of the horizontal doors for guiding the electric vehicle.

3. The method of claim 2, further comprising, after raising the electric vehicle and before raising the second lifts, opening the horizontal doors.

4. The method of claim 3, wherein opening the horizontal doors comprises pivoting the door over-center to keep the door open.

5. The method of claim 3, wherein the horizontal doors are attached to the battery support structures, and wherein the horizontal doors extend through lifting arms attached to the first lifts after raising the second lifts.

6. The method of claim 1, wherein positioning the electric vehicle in at least one of the x and y directions comprises using one or more vehicle chocks.

7. The method of claim 1, wherein raising the electric vehicle using the first lifts comprises engaging jack pads on the electric vehicle using lifting arms on the first lifts.

8. The method of claim 7, wherein the electric vehicle is suspended at four points.

9. The method of claim 7, wherein engaging the jack pads on the electric vehicle using the lifting arms comprises using cone locators for positioning.

10. The method of claim 1, wherein the second lifts are raised until they touch an underside of the first EESS.

11. The method of claim 10, wherein the first EESS is supported by ball transfer pads attached to the battery support structures.

12. The method of claim 1, wherein the second EESS is supported by ball transfer pads attached to the battery support structures, the method further comprising moving the second EESS on the ball transfer pads to align the second EESS with the electric vehicle.

\* \* \* \* \*

UNITED STATES PATENT AND TRADEMARK OFFICE
CERTIFICATE OF CORRECTION

PATENT NO. : 9,688,252 B2
APPLICATION NO. : 14/694995
DATED : June 27, 2017
INVENTOR(S) : Eric Orlando Gaffoglio Page 1 of 1

It is certified that error appears in the above-identified patent and that said Letters Patent is hereby corrected as shown below:

On the Title Page

Item (74): replace "Garlick & Marison" with -- Garlick & Markison --

Signed and Sealed this
Tenth Day of April, 2018

Andrei Iancu
*Director of the United States Patent and Trademark Office*